US012615242B2

(12) United States Patent
Smolsky et al.

(10) Patent No.: US 12,615,242 B2
(45) Date of Patent: Apr. 28, 2026

(54) SECURE WEB GATEWAY VISIBILITY INTO CERTIFICATE-PINNED APPLICATIONS

(71) Applicant: Netskope, Inc., Santa Clara, CA (US)

(72) Inventors: Oleg Murat Smolsky, Sunnyvale, CA (US); Yongjie Yin, Santa Clara, CA (US)

(73) Assignee: Netskope, Inc., Santa Clara, CA (US)

( * ) Notice: Subject to any disclaimer, the term of this patent is extended or adjusted under 35 U.S.C. 154(b) by 113 days.

(21) Appl. No.: 18/437,206

(22) Filed: Feb. 8, 2024

(65) Prior Publication Data

US 2025/0260678 A1 Aug. 14, 2025

(51) Int. Cl.
*H04L 9/40* (2022.01)

(52) U.S. Cl.
CPC ........ *H04L 63/045* (2013.01); *H04L 63/0823* (2013.01); *H04L 63/166* (2013.01); *H04L 63/20* (2013.01)

(58) Field of Classification Search
CPC . H04L 63/045; H04L 63/0823; H04L 63/166; H04L 63/20
See application file for complete search history.

(56) References Cited

U.S. PATENT DOCUMENTS

| 5,440,723 | A | 8/1995 | Arnold et al. |
| 6,513,122 | B1 | 1/2003 | Magdych et al. |
| 6,622,248 | B1 | 9/2003 | Hirai |
| 7,080,408 | B1 | 7/2006 | Pak et al. |
| 7,298,864 | B2 | 11/2007 | Jones |

(Continued)

FOREIGN PATENT DOCUMENTS

| EP | 1063833 A2 | 12/2000 | |
| EP | 4293962 A1 * | 12/2023 | ......... H04L 63/0823 |

OTHER PUBLICATIONS

Wilkens, Florian, et al. "Passive, transparent, and selective TLS decryption for network security monitoring." IFIP International Conference on ICT Systems Security and Privacy Protection. Cham: Springer International Publishing, 2022. (Year: 2022).*

(Continued)

*Primary Examiner* — Michael R Vaughan
(74) *Attorney, Agent, or Firm* — Haynes Beffel & Wolfeld LLP; Ernest J Beffel, Jr.; Jason Liao

(57) ABSTRACT

The disclosed technology teaches a method for security monitoring in TLS or other certificate-pinned sessions by a cloud-based network security system. When a security condition is detected in the decrypted packets, alerts are generated for the client device. The method involves injecting a message into the session using keys extracted by the cloud-based resource for encryption. Some implementations utilize an inspection proxy and an endpoint routing client for secure tunneling. A secure web gateway buffers encrypted packets in a new session with a cloud-based resource, detects a connection access request from a certificate-pinned application, requests and receives key extraction, and forwards keys to the security system. The secure web gateway applies the keys to systematically encrypted traffic, decrypts packets, and relays ongoing session traffic between the security system and the client device via the inspection proxy, which applies security policies during the process.

24 Claims, 17 Drawing Sheets

(56) References Cited

U.S. PATENT DOCUMENTS

| | | | |
|---|---|---|---|
| 7,376,719 B1 | 5/2008 | Shafer et al. | |
| 7,735,116 B1 | 6/2010 | Gauvin | |
| 7,966,654 B2 | 6/2011 | Crawford | |
| 8,000,329 B2 | 8/2011 | Fendick et al. | |
| 8,296,178 B2 | 10/2012 | Hudis et al. | |
| 8,793,151 B2 | 7/2014 | DelZoppo et al. | |
| 8,839,417 B1 | 9/2014 | Jordan | |
| 9,197,601 B2 | 11/2015 | Pasdar | |
| 9,225,734 B1 | 12/2015 | Hastings | |
| 9,231,968 B2 | 1/2016 | Fang et al. | |
| 9,270,765 B2 | 2/2016 | Narayanaswamy et al. | |
| 9,280,678 B2 | 3/2016 | Redberg | |
| 9,398,102 B2 | 7/2016 | Narayanaswamy et al. | |
| 9,811,662 B2 | 11/2017 | Sharpe et al. | |
| 9,967,292 B1* | 5/2018 | Higgins | H04L 63/30 |
| 10,084,825 B1 | 9/2018 | Xu | |
| 10,237,282 B2 | 3/2019 | Nelson et al. | |
| 10,334,442 B2 | 6/2019 | Vaughn et al. | |
| 10,382,468 B2 | 8/2019 | Dods | |
| 10,382,591 B2* | 8/2019 | Galloway | H04L 63/1441 |
| 10,484,334 B1 | 11/2019 | Lee et al. | |
| 10,826,941 B2 | 11/2020 | Jain et al. | |
| 10,868,834 B2* | 12/2020 | Anderson | H04L 63/10 |
| 11,019,101 B2 | 5/2021 | Narayanaswamy et al. | |
| 11,032,301 B2 | 6/2021 | Mandrychenko et al. | |
| 11,036,856 B2 | 6/2021 | Graun et al. | |
| 11,281,775 B2 | 3/2022 | Burdett et al. | |
| 11,310,246 B2* | 4/2022 | Rehak | H04L 63/1441 |
| 11,539,755 B1* | 12/2022 | Boyce | H04L 63/166 |
| 11,805,107 B2 | 10/2023 | Bannister et al. | |
| 11,881,938 B2* | 1/2024 | Konda | H04L 61/58 |
| 12,255,877 B1* | 3/2025 | Smolsky | H04L 63/0428 |
| 2002/0099666 A1 | 7/2002 | Dryer et al. | |
| 2003/0055994 A1 | 3/2003 | Herrmann et al. | |
| 2003/0063321 A1 | 4/2003 | Inoue et al. | |
| 2003/0172292 A1 | 9/2003 | Judge | |
| 2003/0204632 A1 | 10/2003 | Willebeek-LeMair et al. | |
| 2004/0015719 A1 | 1/2004 | Lee et al. | |
| 2005/0010593 A1 | 1/2005 | Fellenstein et al. | |
| 2005/0271246 A1 | 12/2005 | Sharma et al. | |
| 2006/0156401 A1 | 7/2006 | Newstadt et al. | |
| 2007/0204018 A1 | 8/2007 | Chandra et al. | |
| 2007/0237147 A1 | 10/2007 | Quinn et al. | |
| 2008/0069480 A1 | 3/2008 | Aarabi et al. | |
| 2008/0134332 A1 | 6/2008 | Keohane et al. | |
| 2009/0144818 A1 | 6/2009 | Kumar et al. | |
| 2009/0249470 A1 | 10/2009 | Litvin et al. | |
| 2009/0300351 A1 | 12/2009 | Lei et al. | |
| 2010/0017436 A1 | 1/2010 | Wolge | |
| 2011/0119481 A1 | 5/2011 | Auradkar et al. | |
| 2011/0145594 A1 | 6/2011 | Jho et al. | |
| 2012/0278896 A1 | 11/2012 | Fang et al. | |
| 2013/0159694 A1 | 6/2013 | Chiueh et al. | |
| 2013/0298190 A1 | 11/2013 | Sikka et al. | |
| 2013/0347085 A1 | 12/2013 | Hawthorn et al. | |
| 2014/0013112 A1 | 1/2014 | Cidon et al. | |
| 2014/0068030 A1 | 3/2014 | Chambers et al. | |
| 2014/0068705 A1 | 3/2014 | Chambers et al. | |
| 2014/0259093 A1 | 9/2014 | Narayanaswamy et al. | |
| 2014/0282843 A1 | 9/2014 | Buruganahalli et al. | |
| 2014/0359282 A1 | 12/2014 | Shikfa et al. | |
| 2014/0366079 A1 | 12/2014 | Pasdar | |
| 2015/0100357 A1 | 4/2015 | Seese et al. | |
| 2015/0312267 A1* | 10/2015 | Thomas | H04L 63/0227 726/1 |
| 2016/0323318 A1 | 11/2016 | Terrill et al. | |
| 2016/0350145 A1 | 12/2016 | Botzer et al. | |
| 2017/0063883 A1 | 3/2017 | Franzoni Martinez | |
| 2017/0064005 A1 | 3/2017 | Lee | |
| 2017/0093917 A1 | 3/2017 | Chandra et al. | |
| 2017/0250951 A1 | 8/2017 | Wang et al. | |
| 2017/0310670 A1 | 10/2017 | Bronshtein et al. | |
| 2017/0346853 A1* | 11/2017 | Wyatt | H04L 43/12 |
| 2018/0288062 A1* | 10/2018 | Goyal | H04L 63/0281 |
| 2019/0068362 A1* | 2/2019 | Anderson | G06N 5/025 |
| 2020/0050686 A1 | 2/2020 | Kamalapuram et al. | |
| 2020/0053103 A1* | 2/2020 | Rehak | H04L 63/1441 |
| 2020/0092264 A1* | 3/2020 | Rahkonen | H04L 63/20 |
| 2020/0236093 A1* | 7/2020 | Bannister | H04L 9/0861 |
| 2021/0344511 A1* | 11/2021 | Devarajan | H04L 63/0428 |
| 2022/0060450 A1 | 2/2022 | Slovetskiy | |
| 2022/0329442 A1* | 10/2022 | Bulusu | H04L 63/1416 |
| 2022/0360594 A1 | 11/2022 | Cosgrove | |
| 2025/0047657 A1* | 2/2025 | He | H04L 63/166 |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-US/newsroom/press-releases/2016/fortinet- security-fabric-named-2016-crn-network-security-product.

Mccullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-, What are the different email protocols%3F,and also has defined functions.

NIIT, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.

(56)        References Cited

OTHER PUBLICATIONS com/docs.fortinet.com/v2/attachments/fba32b46-b7c0-11ed-8e6d-fa163e15d75b/FortiSandbox-4.2.4-Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.

Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.
Cheng et al., "Cloud Security For Dummies, Netskope Special Edition," John Wiley & Sons, Inc., dated 2015, 53 pages.
"Netskope Introspection," netSkope, Inc., 2015, 3 pgs.
Netskope, "Data Loss Prevention and Monitoring in the Cloud", Nov. 2014, 18 pages.
"Cloud Data Loss Prevention Reference Architecture", Netskope, Sep. 2015, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope, Inc., EB-141-1, 19 pages.
"Repave the Cloud-Data Breach Collision Course," netSkope, Inc., 2014, 6 pgs.
Netskope, "The 5 Steps to Cloud Confidence," netSkope Inc., 2014, 11 pgs.
"Netskope Cloud Confidence Index," netSkope, Inc., 2015, 4 pgs.

* cited by examiner

200

300

500

600

900

1000

Administrator 1002

Secure Web Gateway (SWG) 176

Public Network 101

Cloud Resource 804

Client Device 104

Memory 902

Operating System Kernel 922

Cloud-Based Resource-Associated Library 932

Library-Specific Signature 933

Virtual Address Space 942

Session Keys 954a-n

Browser Application 114

Endpoint Routing Client (ERC) 124

Connection Access Request (CAR) Listener 134

Key Extractor 144

1300

Data Plane Point of Presence 1205

Management Plane Point of Presence 1305

Report Generator 1322

Monitoring Service 1324

Event Storage Service 1326

Configuration Service 1328

Summary Data 1332

Raw Event Data 1334

Configuration 1336

Content Policies 187

Web Management Interface 1362

Provisioning Service 1366

Management Clients 1384

Client Devices 112, 122, 132

1500

Public Network 101

Cloud Resource 804

Administrator 1002

SWG 176

Proxy 1502

Client Device 104

Memory 902

Operating System Kernel 922

Cloud-Based Resource-Associated Library 932

Library-Specific Signature 933

Virtual Address Space 942

Session Keys 954a-n

Browser Application 114

Endpoint Routing Client (ERC) 124

Connection Access Request (CAR) Listener 134

Key Extractor 144

SECURE WEB GATEWAY VISIBILITY INTO CERTIFICATE-PINNED APPLICATIONS

RELATED CASES

This application is related to the following contemporaneously filed application which are incorporated by reference for all purposes as if fully set forth herein:

U.S. patent application Ser. No. 18/437,205 titled "Proxy for Security in Sessions Involving Certificate-Pinned Applications", filed 8 Feb. 2024.

INCORPORATIONS

The following materials are incorporated by reference in this filing:

U.S. patent application Ser. No. 15/958,672, filed Apr. 20, 2018, titled "REDUCING LATENCY IN SECURITY ENFORCEMENT BY A NETWORK SECURITY SYSTEM (NSS),";

U.S. patent application Ser. No. 15/958,637, filed Apr. 20, 2018, titled "REDUCING ERROR IN SECURITY ENFORCEMENT BY A NETWORK SECURITY SYSTEM (NSS),";

FIELD OF THE TECHNOLOGY DISCLOSED

The technology disclosed generally relates to cloud-based data security, and more specifically to security monitoring of encrypted sessions between a cloud-based resource that uses a pinned certificate and a client device using an endpoint routing client to securely tunnel sessions with cloud-based resources via a public network through a cloud-based network security system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud-based computing and the demand to be able to work from anywhere, anytime are two factors that are accelerating the push for comprehensive security access service edge systems that address the need for secure access to data from any device at any time and from any location.

Cybercriminals see the cloud as an effective method for subverting detection. Patterns of cyberthreats and malicious insiders change constantly. Meanwhile, sensitive data is increasingly distributed and moving to applications that are not necessarily sanctioned or properly secured. Security policies often need to be evaluated for individual users in real time, for example, when users are uploading and downloading files, browsing websites, or accessing data in the cloud. Millions of critical decisions impacting user experience need to be made daily.

Existing network security architectures were designed with the enterprise data center as the focal point for access needs. Meanwhile, IT architectures like cloud and edge computing and work-from-anywhere capability result in more users, devices, applications, services, and data located outside of an enterprise than inside.

Enterprises, users, and cloud-based resources rely on end-to-end security via secure channels, which are often built on cryptographic protocols such as Transport Layer Security (TLS), Secure Sockets Layer (SSL), and other digital-certificate based protocols that rely on certificate authorities in order to establish a hierarchy of trust. However, hierarchy of trust models can be breached by man-in-the-middle attacks in which the certificate authority is compromised, enabling eavesdropping or even tampering with the communication between the server and the client endpoint.

To this end, an increasing number of cloud-based resources are implementing certificate pinning for authentication of secure connections between the cloud-based resource server and a client endpoint. Certificate pinning does not rely on Domain Name System (DNS) for name/address mappings or certificate authorities and thus, reduces issues with key distribution in order to improve security. Instead, the expected certificate is pinned (i.e., stored within local memory on the client device and/or added to an application associated with the cloud-based resource at development time) and a secure connection with the cloud-based resource is only approved when the offered certificate matches the expected certificate. However, cloud-based network security systems have no visibility into applications that firmly pin the server-side certificate received during a TLS handshake. Certificate pinning prevents proxying of the associated TCP connections and the ability to apply data loss prevention (DLP) or security policies is lost.

An opportunity arises for a method of security monitoring that includes buffering encrypted packets from a secure session with a certificate-pinned application, receiving session keys extracted from a virtual address space, and using the extracted keys to decrypt the buffered session data flow. Accordingly, an opportunity also emerges for a method of security monitoring that leverages extracted session keys to enable proxy compatibility with certificate-pinned application communication sessions.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
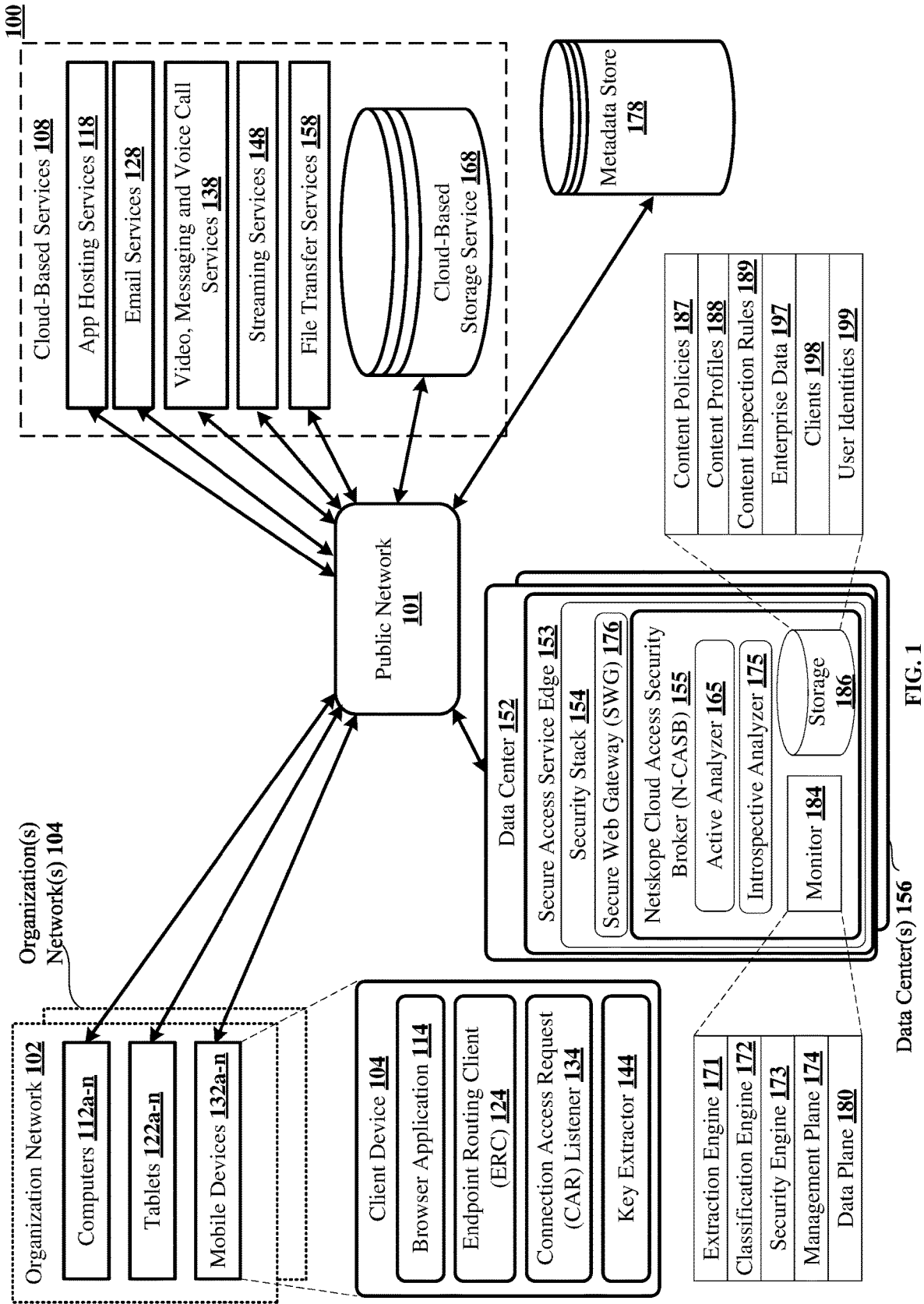
FIG. 1 illustrates an architectural level schematic of a system for providing security monitoring of secure sessions between certificate-pinned applications on a client device and a cloud-based resource, in accordance with an implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Digital resources, such as file storage services or online banking and similar financial services, often utilize TLS/SSL certificates in their web interfaces or mobile applications to protect customers' assets. Browsers utilize a trusted set of certificate authorities. In one example when no proxy is in use for bankamerica.com communication from a browser, bankamerica.com would return an X.509 certificate signed by a trusted authority. The X.509 certificate binds an identity to a public key using a digital signature. The certificate contains an identity (a hostname, an organization, or an individual) and a public key (RSA, digital signature algorithm (DSA), ECDSA, ed25519, etc.), and is either signed by a certificate authority (CA) or is self-signed. When a certificate is signed by a trusted CA, or validated by other means, someone holding that certificate can use the public key it contains to establish secure communications with another party, or validate documents digitally signed by the corresponding private key. Next, we summarize aspects of the TLS/SSL security protocol.

Transport layer security (TLS), (evolved from secure sockets layer (SSL)), is an encryption-based Internet security protocol that encrypts data that is transmitted across the web, for communication between web applications and servers, such as web browsers loading a website. TLS/SSL initiates an authentication handshake between two communicating devices to ensure that both devices are really who they claim to be. TLS/SSL also digitally signs data in order to provide data integrity, verifying that the data is not tampered with before reaching its intended recipient.

For a website or application to use TLS, it must have a TLS certificate installed on its origin server, for fulfilling the functions of authentication and data encryption. First, the certificate can assist with authenticating and verifying the identity of a host or site. The TLS certificate has information about the authenticity of details around the identity of a host or site. So, when one clicks on the padlock displayed or checks the trust mark, the certificate chain details prove where the certificate is generated from. Second, the certificate enables the encryption of information exchanged via a website. When data in transit is encrypted, the sensitive information exchanged via the website cannot be intercepted and read by anyone other than the intended recipient.

A certificate authority (CA), such as DigiCert (which is one of a hundred different certificate authorities) is an entity that issues digital certificates. A CA issues a TLS certificate to the person or business that owns a domain. The certificate contains important information about who owns the domain, along with the server's public key, both of which are important for validating the server's identity. TLS/SSL certificates are most reliable when issued by a trusted CA which follows stringent rules and policies about who may or may not receive a TLS/SSL Certificate. So, when one has a valid TLS/SSL Certificate from a trusted CA, there is a higher degree of trust. A digital certificate certifies the ownership of a public key by the named subject of the certificate. When a CA signs a TLS/SSL certificate or another entity validates them, the owner of that certificate can leverage the public key to establish secure connections with another party or validate documents someone digitally signed using the corresponding private key.

TLS/SSL certificate protocols can offer better protection against man-in-the-middle attacks than other TCP/IP protocols. Cybercriminals are able to carry out man-in-the-middle attacks to intercept data and attack encrypted connections using various techniques such as IP spoofing or address resolution protocol (ARP) spoofing attacks. It is more difficult to execute a man-in-the-middle attack on a TLS/SSL connection (e.g., TLS/SSL hijacking or stripping attacks) because a web browser will only trust certificates signed by the trusted certificate authority due to the public key infrastructure (PKI) system used in TLS/SSL protocols. If a certificate is not signed by a trusted certificate authority, the web browser may notify the user of a security risk or block initiation of the connection entirely. In a TLS/SSL hijacking example, the attacker must generate a fake certificate that impersonates the certificate authority and successfully add the fake certificate to the trusted certificate store in the user device's operating system. Often, such an attack cannot be performed unless it is done in combination with other attack techniques.

Despite improving on previous connection protocols, malware designed specifically to steal TLS/SSL keys and/or certificates is increasingly common. When the certificate authority hierarchy of trust model is breached, eavesdropping or tampering with the connection traffic can occur. In order to mitigate this risk, many cloud-based resources are turning towards alternative solutions such as decentralized trust models or certificate pinning protocols. While decentralized models that establish a web of trust, in contrast to a hierarchy of trust, are less vulnerable to these man-in-the-middle attacks due to eliminating the certificate authority as a single point of failure, decentralized models introduce new problems with implementation feasibility and credibility while still possessing a risk for public key server attacks by third-party middle men. An increasing number of cloud-based resources are opting instead for pinned certificate protocols to authenticate secure connections between the cloud-based resource server and a client endpoint.

Certificate pinning does not rely on DNS for name/address mappings or certificate authorities, effectively preventing security breaches that result from insecure key distribution in public key infrastructure systems. Instead, the expected certificate (or public key, in certain protocols) associated with the cloud-based resource server is stored within the certificate store that is locally stored on the client device and/or added to an application associated with the cloud-based resource. In order for the client endpoint to establish a secure connection with the cloud-based resource, the certificate presented towards the client must match the expected certificate "pinned" to the device or application.

In certain scenarios, the certificate (or public key(s)) can be pinned to an application at development time. This technique of preloading the expected certificate out of band can be effective at preventing attackers from accessing the certificate. In other scenarios, it may be preferable to pin the certificate upon first encounter, also referred to as key continuity. While key continuity may potentially introduce vulnerability at the first encounter, it also enables flexibility; e.g., updating the expected certificate at regular intervals or if a certificate or session key becomes compromised. While a number of pinning techniques exist, certificate pinning generally refers to the process of associating a host, such as a cloud-based resource, with the expected certificate.

Although certificate pinning protocols offer certain security advantages, they also have the disadvantage of limited compatibility with common security monitoring tools offered in association with network security systems. Without access to the pinned certificate or session key(s), a network security system is unable to decrypt session traffic within an encrypted session between a client endpoint and a cloud-based server. Consequently, the ability to apply data loss prevention (DLP), content-specific security policies, or proxying of the associated TCP connection(s) is substantially reduced. The result is a "bypass" configuration where the session traffic travels through a security tool, such as the Secure Web Gateway offered by Netskope™, with no visibility into the session traffic. In order to address this traffic visibility problem, the solution provided by the technology disclosed includes a mitigation mechanism that enables visibility into the formerly un-decryptable session traffic and security monitoring of the session traffic. As a result, enterprises have access to a wider support matrix within a network security system that covers native applications on client devices that leverage certificate pinning protocols. Accordingly, the technology disclosed also provides a solution to the compatibility issue between certificate-pinned applications and security monitoring tools like network inspection proxies or enforcement of threat policies.

Many implementations of the technology disclosed include a method of security monitoring of, and generating alerts during, a TLS or other pinned certificate session. The disclosed method can include using an endpoint routing client on the client device to securely tunnel sessions with cloud-based resources via a public network through a cloud-based network security system. A secure web gateway associated with the cloud-based security system can buffer encrypted packets of a new session with a cloud-based resource that uses a pinned certificate and bi-directionally forward the encrypted packets between the client device and the cloud-based decide through the secure web gateway. The method can further include detecting an initiation of the new session (e.g., a connection access request) on the client device from a supported certificate-pinned application and requesting a key extraction for one or more keys used in the new session, receiving the one or more extracted keys, and securely forwarding them to the cloud-based network security system. The secure web gateway is then able to apply the extracted keys to session traffic in the buffer that is systematically encrypted traffic and decrypt the buffered packets. The method can also include the cloud-based network security system applying the extracted keys to decrypt ongoing session traffic after processing the buffered packets. The cloud-based security system may also detect a security condition, indicated by content of the decrypted packets, that requires alerting an administrator and raising an alert to the administrator.

In other implementations, a method of security monitoring of, and generating alerts during, a TLS or other pinned certificate session is disclosed that includes the cloud-based network security system detecting a security condition indicated by content of the decrypted packets that requires alerting the client device. The method can further include injecting, into the session, a message to the client device by applying the extracted keys used by the cloud-based resource for encryption. Certain other implementations of the method disclosed leverage an inspection proxy, wherein the method includes using an endpoint routing client to securely tunnel sessions with cloud-based resources via the inspection proxy through a cloud-based network security system. The method can further include a secure web gateway buffering encrypted packets of a new session with a cloud-based resource that uses a pinned certificate and bi-directionally forwarding the encrypted packets between the inspection proxy and the cloud-based resource, through the secure web gateway, and detecting (via the inspection proxy) a connection access request for initiation of the new session from a supported certificate-pinned application, requesting a key extraction for one or more keys used in the new session, receiving the one or more extracted keys, and securely forwarding them to the cloud-based network security system. The secure web gateway is then able to apply the extracted keys to session traffic in the buffer that is systematically encrypted traffic and decrypt the buffered packets. The decrypted ongoing session traffic can be pushed to the inspection proxy, wherein the inspection proxy bi-directionally relays decrypted ongoing session traffic between the cloud-based network security system and the client device. In one implementation, the inspection proxy inspects at least some session traffic relayed during the new session, applying security policies supplied by an administrator.

Throughout the description of the figures, certain terms are synonymously interchanged in view of specific contexts to improve clarity of the discussion. Nonetheless, it is to be understood that the technology disclosed generally refers to an entity (distinct from and not controlled by an organization) operating at least one inspection proxy between organization browsers and clients (i.e., users) and cloud-based resources, wherein the organization browsers are used by users in the organization and the organization has an organization CA.

Acronyms

Acronyms used in this disclosure are identified the first time that they are used. These acronyms are terms of art, often used in standards documents. Except where the terms are used in a clear and distinctly different sense than they are used in the art, we adopt the meanings found in security system environments. For the reader's convenience, many of them are listed here:

Security services customers using the disclosed technology are able to specify which policy enforcement services apply for different types of tenant data, and to customize security policies for the data being transmitted via the devices of their organizations. In the context of this application, policy enforcement and security are used interchangeably in most contexts. An example system for managing a cloud-based policy enforcement system that unifies functions of packet-based and protocol-based access control and traffic inspection, threat detection and activity contextualization on inspectable and non-inspectable traffic is described next.

Cloud-Based Network Security System Architecture

FIG. 1 shows an architectural level schematic of a system 100 for security monitoring of, and generating alerts during, a TLS or other pinned certificate session. System 100 includes functionality to funnel a secure connection between a client device (e.g., a TLS connection accessed via a web browser application or client application programming interface (API)) and a cloud-based resource (e.g., a cloud service such as Google Drive™ or Amazon Web Services™ (AWS)) through an endpoint routing client (ERC) running on the client device such as a cloud access security broker. System

| AV | Anti-Virus |
|---|---|
| AWS | Amazon Web Services Cloud Platform |
| BT | BitTorrent communication protocol for P2P file sharing |
| CASB | Cloud Access Security Broker |
| CIDL | Connected Intelligence Data Lake |
| CIDR | Classless Inter-Domain Routing |
| CSPM | Certified Security Project Management |
| CWPP | Cloud Workload Protection Program |
| DHCP | Dynamic Host Configuration Protocol |
| DLP | Data Loss Prevention |
| DPI | Deep Pocket Inspection |
| ECG | Elastic Cloud Gateway |
| FTP | File Transfer Protocol |
| GCP | Google Cloud Platform |
| GDPR | General Data Protection Regulation (EU) |
| GRE | Generic Routing Encapsulation |
| HTTP | Hypertext Transfer Protocol |
| HTTPS | Hypertext Transfer Protocol Secure |
| ICMP | Internet Control Message Protocol |
| IdP | Identity Provider |
| IDP | Intrusion Detection Program |
| IKE | Internet Key Exchange - protocol used to set up a security association (SA) in the IPsec protocol suite |
| IMAP | Internet Message Access Protocol used to retrieve mail at the receiver's side |
| IOC | Indicator of compromise |
| IPS | Intrusion Prevention System |
| IPsec | Internet Protocol Security |
| JSON | JavaScript Object Notation |
| MTU | Maximum Transmission Unit |
| NAT | Network Address Translation |
| N-CASB | Netskope Cloud Access Security Broker |
| NG-SWG | Next Generation-Secure Web Gateway |
| PII | Personally Identifiable Information |
| POP | Point of Presence |
| P2P | Peer to Peer |
| RBAC | Role-Based Administration Controls |
| SaaS | Software as a Service |
| SASE | Secure Access Service Edge |
| SD-WAN | Software-Defined Wide Area Network |
| SDP | Software-Defined Perimeter |
| SIEM | Security Information and Event Management |
| SIP | Session Initiation Protocol |
| SMTP | Simple Mail Transfer Protocol |
| SSL | Secure Socket Layer |
| SWG | Secure Web Gateway |
| TCP | Transmission Control Protocol |
| TSS | Threat Scanning Service |
| UDP | User Datagram Protocol |
| UTM | Unified Threat Management |
| ZTNA | Zero Trust Secure Network Access |

100 also includes functionality for interoperating with single sign-on (SSO) solutions and/or corporate identity directories. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes organization network 102, data center 152 with secure access service edge (SASE) system 153 with security stack 154, secure web gateway (SWG) 176, Netskope cloud access security broker (N-CASB) 155 and cloud-based services 108. SASE system 153 comprises the amalgamation of network security functions through SWG 176 and N-CASB 155, as well as zero trust network access (ZTNA), virtual private network (VPN), and software-defined wide area networking (SD-WAN) capabilities (omitted to improve clarity). Organization network 102 includes computers 112a-n, tablets 122a-n and mobile devices 132a-n. System 100 includes multiple organization networks 104 for multiple subscribers, also referred to as multi-tenant networks, of a security services provider and multiple data centers 156. In another organization network, organization users may utilize additional devices. Cloud services 108 includes cloud-based app hosting services 118, web email services 128, video, messaging and voice call services 138, streaming services 148, file transfer services 158, and cloud-based storage service 168. Data center 152 connects to organization network 102 and cloud-based services 108 via public network 145. Netskope cloud access security broker (N-CASB) 155, between cloud service consumers and cloud service providers, combines and interjects enterprise security policies as cloud-based resources are accessed.

Continuing the description of FIG. 1, each security layer of security stack 154 can detect issues. Enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data. For further information regarding the functionality of active analyzer and introspective analyzer, reference can be made to, for example, commonly owned U.S. Pat. No. 9,398,102 (NSKO 1000-2); U.S. Pat. No. 9,270,765 (NSKO 1000-3); U.S. Pat. No. 9,928,377 (NSKO 1001-2); and U.S. patent application Ser. No. 15/368,246 (NSKO 1003-3).

Continuing further with the description of FIG. 1, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or corporate identity directory but is distinct from it. In one implementation, a cryptographic certificate signed by the network security is used as the user identity. In other implementations, the user identity can be solely unique to the user and be identical across devices.

Further describing system 100 of FIG. 1, embodiments can also interoperate with single sign-on (SSO) solutions and/or corporate identity directories, e.g., Microsoft's Active Directory (AD). Such embodiments may allow policies to be defined in the directory, e.g., either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g., a dedicated account held by the system that holds the only credentials to sign-in to the service. In other embodiments, the client may encrypt the sign-on credentials before passing the login to the hosted service, meaning that the networking security system "owns" the password.

Storage 186, displayed in FIG. 1, can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Object Notation), BSON (Binary JSON), XML, Protobuf, Avro or Thrift object, which consists of string fields (or columns) and corresponding values of potentially different types like numbers, strings, arrays, objects, etc. JSON objects can be nested, and the fields can be multi-valued, e.g., arrays, nested arrays, etc., in other implementations. These JSON objects are stored in a schema-less or NoSQL key-value metadata store 178 like Apache Cassandra™, Google's Bigtable™, HBase™, Voldemort™, CouchDB™, MongoDB™, Redis™, Riak™, Neo4j™, etc., which stores the parsed JSON objects using key spaces that are equivalent to a database in SQL. Each key space is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, time-stamps, and so forth within the data received. Parsing is the process of breaking up and analyzing a stream of text into keywords, or other meaningful elements called "targetable parameters". In one implementation, a list of targeting parameters becomes input for further processing such as parsing or text mining, for instance, by a matching engine (not shown). Parsing extracts meaning from available meta-data. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the iden-tification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1, system 100 can include any number of cloud-based services 108: point to point streaming services, hosted services, cloud applications, cloud stores, cloud collaboration and messag-ing platforms, and cloud customer relationship management (CRM) platforms. The services can include peer-to-peer file sharing (P2P) via protocols for portal traffic such as BitTor-rent (BT), user data protocol (UDP) streaming and file transfer protocol (FTP); voice, video and messaging multi-media communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as inter-nal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™.

In the interconnection of the elements of system 100, network 145 couples computers 112*a-n*, tablets 122*a-n* and mobile devices 132*a-n*, cloud-based hosting service 118, web email services 128, video, messaging and voice call services 138, streaming services 148, file transfer services 158, cloud-based storage service 168, SWG 176 and N-CASB 155 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service plat-forms such as Rackspace, Heroku or Force.com from Sales-force could be used rather than implementing N-CASB 155 on direct physical computers or traditional virtual machines. Additionally, one or more engines can be used, and one or more points of presence (POPs) can be established to implement the security functions. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs are hosted on the client's premises or located in a virtual private network controlled by the client.

N-CASB 155 provides a variety of functions via a man-agement plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112*a-n*, tablets 122*a-n* and mobile devices 132*a-n* in organization network 102.

Computers 112*a-n*, tablets 122*a-n* and mobile devices 132*a-n* in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g., a corporate identities directory such as a Microsoft Active Directory (AD) or an implementation of open Lightweight Directory Access Protocol (LDAP) pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g., read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. No. 9,398,102 (NSKO 1000-2); U.S. Pat. No. 9,270,765 (NSKO 1000-3); U.S. Pat. No. 9,928,377 (NSKO 1001-2); and U.S. patent application Ser. No. 15/368,246 (NSKO 1003-3); Cheng, Ithal, Narayanaswamy and Malmskog *Cloud Security For Dummies, Netskope Special Edition*, John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Active Platform*" by Netskope, Inc.; "*The Netskope Advantage: Three "Must-Have" Requirements for Cloud Access Security Brokers*" by Netskope, Inc.; "*The 15 Critical CASB Use Cases*" by Netskope, Inc.; "*Netskope Active Cloud DLP*" by Netskope, Inc.; "*Repave the Cloud-Data Breach Collision Course*" by Netskope, Inc.; and "*Netskope Cloud Confidence Index™*" by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance and/or security. In one implementation, the data plane is on-premises or on a virtual private network and the management plane of the network security system is located in cloud services or with corporate networks, as described herein. For another secure network implementation, the POPs can be distributed differently.

If a cloud-based service 108 uses a certificate pinning protocol, in which the associated certificate used by the cloud-based service 108 is pinned to a client device 104, security stack 154 and the related components are unable to perform security monitoring of the encrypted traffic data within a secure session with a cloud-based service 108. While most natively-compiled applications use the operating system (e.g., Windows, Linux) certificate store of the client device 104, some cloud-based services 108 offer client applications (e.g., Google Drive, Evernote, and Dropbox) that use a private certificate store rather than the operating system certificate store or even pin the expected server's certificate. Important data flows through these applications, and so it is useful to decrypt and process packets transmitted during secure sessions with the application servers. Either the certificate or the public keys used for encryption can be pinned or stored within a private certificate store; however, the description herein refers to this process generally as certificate pinning for clarity and conciseness and it is to be understood that public key pinning or the use of a private store may be used in certain implementations.

Client device 104 may be any of computers 112*a-n*, tablets 122*a-n* and mobile devices 132*a-n* or other devices that will be readily apparent to a user skilled in the art. In order to decrypt and monitor session data, security stack 154 must be able to access the one or more session keys associated with the encrypted session. If cloud-based service 108 uses a TLS certificate handshake without certificate pinning, an inspection proxy operating within the SWG 176 is trusted by the web browser 114 and hence, the proxy is able to perform TLS handshakes on behalf of the server. However, if cloud-based service 108 uses a pinned certificate, there is no way to proxy or inspect secure sessions with the cloud-based resource server without intercepting the session keys. The technology disclosed introduces session key intercept functionality to the SWG 176, enabling decryption of pinned certificate TLS sessions that would otherwise be bypassed for security monitoring.

The session key intercept process can include operations performed by modules operating on client device 104 in many implementations. Browser 114, an endpoint routing client (ERC) 124, a connection access request (CAR) listener 134, and key extractor 144 operate within client device 104. ERC 124 tunnels loss prevention inspectable connection access requests to security stack 154 over a secure encrypted channel. ERC 104 can securely tunnel sessions with the cloud-based resource 108 via network 101 via a cloud-based network security system such as SWG 176 and route bandwidth conservable connection access requests to cloud-based service 108. During a new secure session with cloud-based resource 108, which uses a pinned certificate, SWG 176 can buffer encrypted packets of the new session and bi-directionally forward the encrypted packets between client device 104 and cloud-based resource 108.

A bypass list(s), a supplemental bypass list(s), a user identity, a policy, a parser, a classifier, and a domain whitelist(s) can be provided, either embedded into the ERC 124 or as standalone items. Regarding ERC 124, depending on the type of device, it can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. ERC 124 can also be an agent that is downloaded using e-mail or silently installed using mass deployment tools like ConfigMgr™, Altris™, and Jamf™.

In order to decrypt the encrypted packets being sent between client device 104 and cloud-based resource 108, SWG requires the associated session key(s). CAR listener 134 detects a connection access request for initiation of the new session from a supported certificate-pinned application and requests a key extraction for one or more keys used in the new session. Subsequently, key extractor 144 extracts the session keys and forwards them to the SWG 176. The key extraction process is described in further detail with reference to FIGS. 9-10. Once the SWG 176 has access to the session keys, the keys can be applied to the session traffic in the buffer (i.e., symmetrically encrypted traffic) and decrypting the buffered packets. As the session continues, the SWG 176 can continue to apply the extracted keys to decrypt ongoing session traffic after processing the buffered packets. In some scenarios, security monitoring of the session traffic includes detecting a security condition, indicated by content of the decrypted packets, that requires alerting an administrator. In other scenarios, the session can be terminated by injecting a message into the secure session. One or more security policies may be involved in the definition and detection of a security condition.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer-readable medium such as a computer-readable storage medium that stores computer-readable instructions or computer program code, or as a computer program product comprising a computer usable medium having a computer readable program code embodied therein. The technology disclosed can be implemented in the context of any computer-implemented system, including a database system or a relational database implementation like an Oracle™ compatible database implementation, an IBM DB2 Enterprise Server™ compatible relational database implementation, a MySQL™ or PostgreSQL™ compatible relational database implementation, or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

Figure 2:
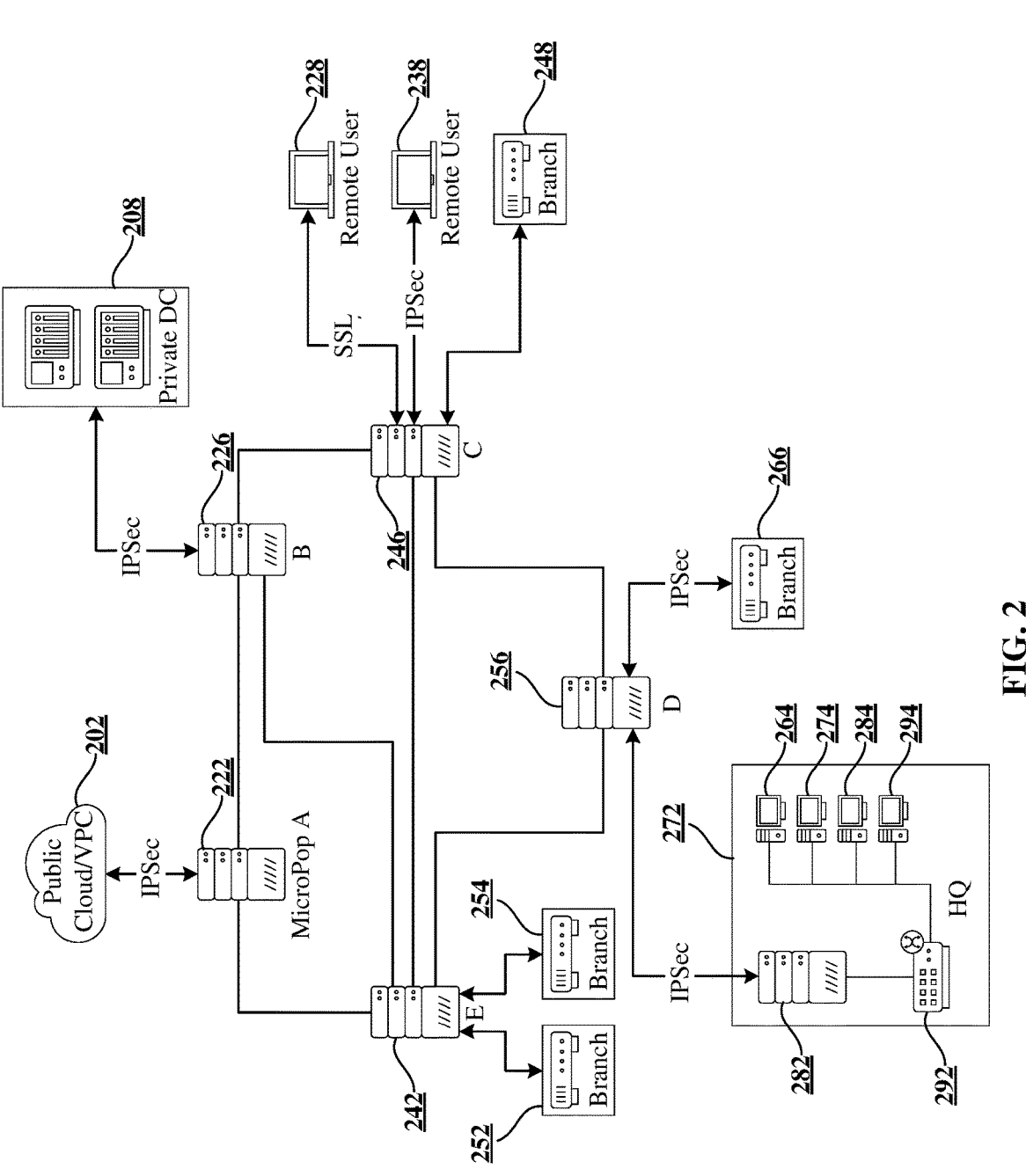
FIG. 2 shows a block diagram for an example distributed network of secure services.

FIG. 2 shows an example block diagram for a distributed network of secure services for data centers. The network includes security headquarters 272, points of presence (POPs) 222, 226, 242, 246 and 256, public cloud/virtual private cloud 202, private data center 208, remote users 228, 238 and branch offices 252, 254, 248,266 which are multi-user aggregations. Security headquarters 272 utilizes IPsec protocol for the security association (SA), and includes servers 282 and network device 292 that connects end devices 264, 274, 284 and 294, which can be any of computers, tablets, cell phones, smart watches or other devices not explicitly listed here. Points of presence (POP) 222, 226, 242, 246 and 256 implement data centers, which refers to locations at which servers or network equipment is present. POP can be referred to as a cluster or set of nodes, where a node refers to a physical machine running multiple pods. In one implementation, one node runs two to three pods, which each include a set of containers which run processes. Three to four containers run in a pod and a single process runs in a container, in one implementation. Each process runs a set of threads, often with one core provisioned per thread. In another example case, configurations with different numbers of pods and containers and processes can be configured in the distributed system. In the FIG. 2 example, Micro POP A 222 connects via IPSec to public cloud or virtual private cloud 202 and connects to POP B 226 and POP E 242. POP B 226 includes IPSec access to private data center 208 and is one of the set of nodes that also includes POP C 246 and POP E 242. POP C 246 connects via SSL/IPSec with remote users 228, 238 and with branch service 248. POP D 256 is a node in the cluster with Micro POP C 246, Micro POP E 242 and headquarters 272. POP D 256 also includes branch service 266 which connects via IPSec.

Figure 3:
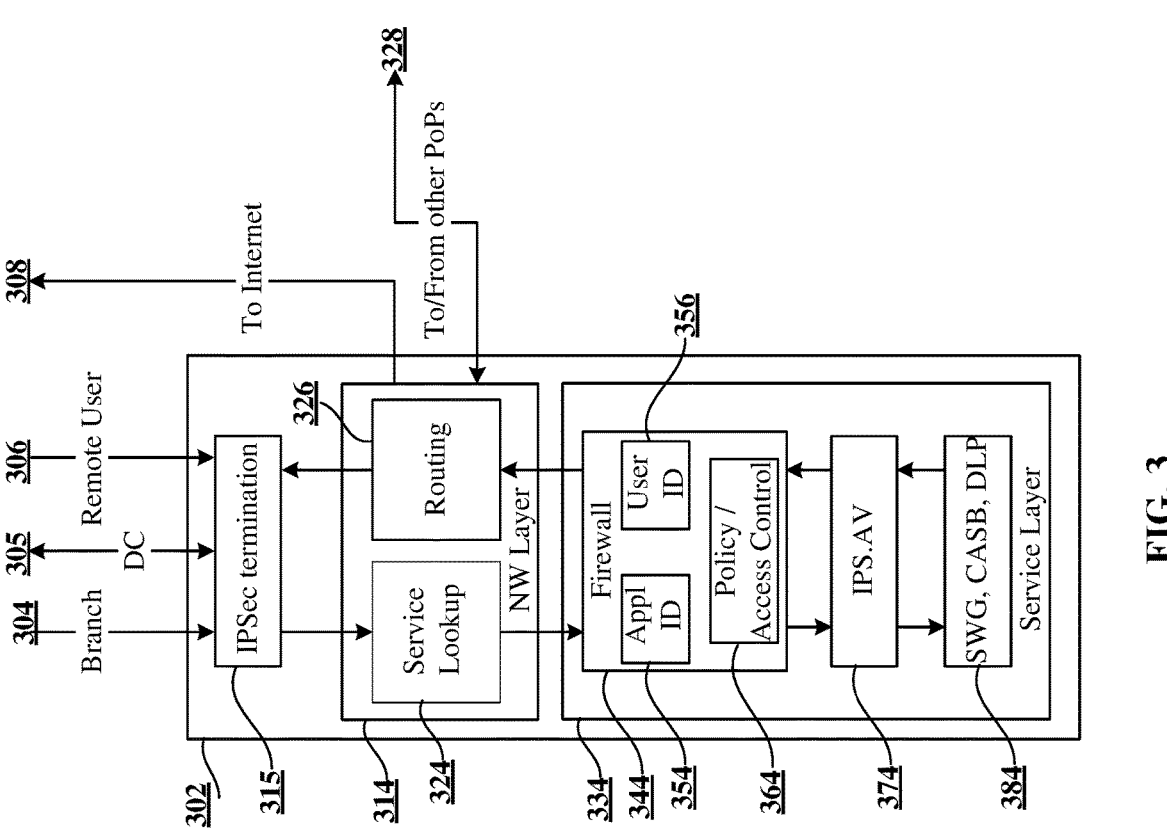
FIG. 3 illustrates disclosed policy enforcement layers for managing a cloud-based policy enforcement system that unifies functions of access control and traffic inspection, threat detection, activity contextualization and data loss prevention analysis on inspectable and non-inspectable traffic.

FIG. 3 illustrates disclosed policy enforcement layers for a cloud-based policy enforcement system that unifies functions of packet-level and protocol-level access control and traffic inspection, threat detection, activity contextualization and data loss prevention analysis on inspectable and non-inspectable traffic. The disclosed policy enforcement layers address the concern of traffic traveling outside of an enterprise data center, and whether the user is behind a corporate firewall by delivering consistent visibility and enforcement of security policy. The cloud-based policy enforcement system includes the delivery of networking and security services for traffic en route to the Internet, cloud applications or the data center. When users access applications, the packet has an entry point at a secure access service edge (SASE) and an SASE egress exit point.

Packets flow through several logical components and boundaries in system 302, where multiple security functions offer identity-based secure access, delivering cloud-based security services. Streams of data can arrive at IPSec termination 315 in POP 302 from a branch server 304, from data center 305 or from remote user 306. The user could be in any of a number of different locations, such as the office or at home, and need to use a cloud-based application. For that case, the user's request to access an application traverses a local area network to the network's edge. For users working from home, the user and the network edge are in the same building, in one example.

Continuing the description of FIG. 3, IPSec termination 315 routes to network layer 314 for service lookup 324, and network layer 314 routes all traffic for all protocols to firewall 344, based on service lookup 324 results for service layer 334 and routes secure packets to the Internet 308 and to and from other points of presence (POPs) 328. Firewall 344 utilizes IP range, expressible via a compact represen- tation of an IP address and its associated routing prefix (CIDR) for the network mask, using application ID 354 and user ID 356 for determining policy and access control 364 for users and maps packet streams to intrusion prevention system (IPS) anti-virus (AV) 374. Service layer 334 includes secure web gateway (SWG) for all web apps, CASB for cloud apps and data loss prevention (DLP) 384, thereby using a single gateway to achieve network security.

Figure 4:
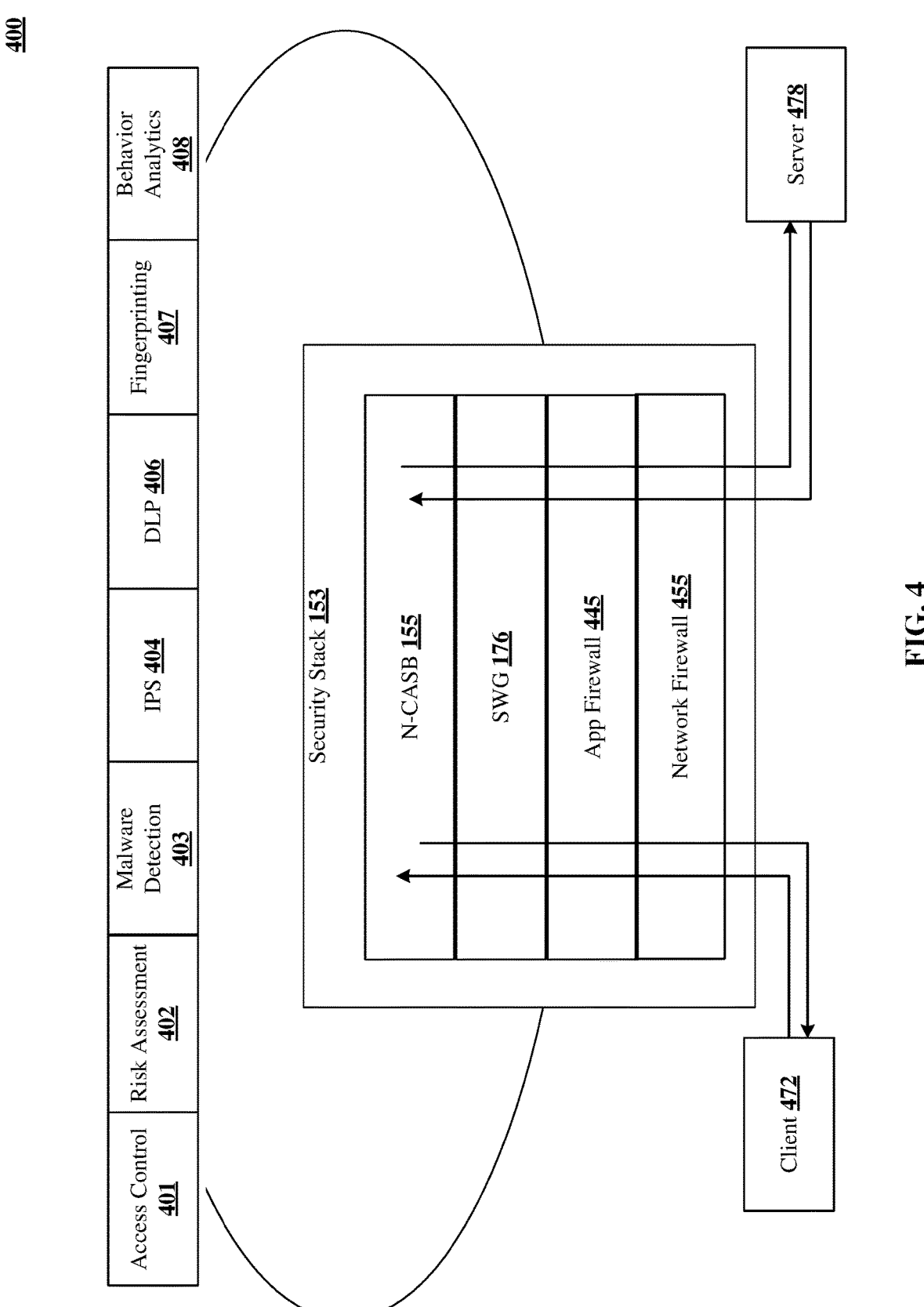
FIG. 4 illustrates the disclosed policy enforcement stack with a comprehensive suite of policy enforcement components and an example logical traffic flow for the cloud-based policy enforcement system that unifies functions of packet-level and protocol-level access control and traffic inspection, threat detection and activity contextualization on inspectable and non-inspectable traffic, for one implementation of the disclosed technology.

FIG. 4 illustrates the disclosed security stack with a comprehensive suite of policy enforcement components and an example logical traffic flow for the disclosed cloud-based security system that unifies functions of packet-level and protocol-level access control and traffic inspection, threat detection and activity contextualization on inspectable and non-inspectable traffic, for one implementation of the dis- closed technology. Security stack 153 layers include net- work firewall 455, app firewall 445, secure web gateway (SWG) 176 and N-CASB 155 in one embodiment. Network firewall 455 analyzes IP packets and connections to detect anomalies and apply policies based on packet headers. App firewall 445 analyzes application protocols and streams of data to detect protocol anomalies for HTTP/S and other network protocols, such as server message block (SMB), file transfer protocol (FTP), simple mail transfer protocol (SMTP) and domain name service (DNS). SWG 176 ana- lyzes web operations to detect anomalies in the data and prevent access to unsanctioned and dangerous websites.

N-CASB 155 can control web applications and operations like login, file transfer and sharing and detect anomalies in the data and accesses. Security functions include access control 401, risk assessment 402, malware detection 403, Intrusion Prevention System (IPS) 404, data loss prevention (DLP) 406, fingerprinting 407 and behavior analytics 408 and can include additional policy enforcement features. Access control 401 can be applied to any type of traffic and be based on multiple criteria. Risk assessment 402 applies to all traffic based on destination accessed. Malware detection 403 assesses security of inspectable and decrypted traffic. IPS 404 gets applied to decrypted and non-decrypted traffic, assessing signatures of packet flow/message exchange that are abnormal or misdirected. DLP 406 performs security functions on decrypted files. Fingerprinting 407 executes a file level hash for decrypted protocols, Behavior analytics 408 analyzes any traffic, varying based on the amount of information that can be collected for a session.

Continuing the description of FIG. 4, traffic travels from client 472 up and down through the layers of security stack 153 to server 478. Each security layer can detect issues and enforce policies when it first sees the traffic, on the way up security stack 153, or after an upper layer has done some processing on the traffic, so on the way down, in various implementations of security policies. For example, App firewall 445 can detect HTTP/S protocol issues for traffic routed between client 472 and server 478, at SWG 176/N- CASB 155 or at SWG 176/N-CASB 155.

Further continuing the description of FIG. 4, response traffic flows from server 478 to client 472, through the layers of security stack 153, being handed off for detecting issues and enforcing policies at the security layers network firewall 455, app firewall 445, SWG 176 and N-CASB 155. The policy enforcement can be applied when security stack 153 receives the response from server 478. In one example, app firewall 445 may find malicious content returned from server

478 that may cause the response to be put in a restrictive state. Similarly, the N-CASB 155 may detect sensitive data in a file download, which will be in the response to a download activity. That is, an incoming access request can pass all the service checks, but the response can fail a check and cause a restrictive action. Particular information that can only be discovered by certain security layers is passed along the chain of security features so that enforcement can be done at any layer whenever the full set of policy criteria matching can be completed. For example, if user info for certain traffic can be discovered only by N-CASB 155 after proxying and decrypting the traffic, network firewall 455 could combine that discovered information with other packet header info to enforce the policy after the packet stream has gone through N-CASB 155. Vice versa, info, from the lower security layers in the stack, can be discovered and passed to upper layers, and the upper layers can then complete the security enforcement. Depending on the traffic type, traffic might not go all the way up to N-CASB 155. Cloud app traffic goes through the full complement of network security layers in the stack. Other web traffic goes up to SWG 176. Non-HTTP/S traffic is examined at app firewall 445. Each layer of security stack 153 can apply the policy enforcement functions on the traffic it sees. Examples are described next of security features applied to various traffic types.

Network firewall 455 controls access based on packet header fields, and applies risk assessment to traffic based on the destination accessed, as specified by the destination IP, port and protocol. Network firewall 455 can share IP addresses, TCP/UDP ports, protocol, VLAN and priority.

The disclosed security system of cloud-based components enforces security policies in multiple scenarios. The security system routes data packets for inspection for detecting malformed packet headers, malicious signatures and incom- ing access requests directed to threat destinations, and for recognizing and processing content-containing activity, to classify the activity as compromising or not. In one scenario, packet streams traverse the full set of layers of cloud-based components, some of which may take no action for a packet stream. In another scenario, packet streams can be selec- tively directed through the cloud-based components that apply to the type of data in the packets. Responses are also routed through the full set of layers of cloud-based compo- nents, in some scenarios.

Disclosed Netskope policy manager 157 manages packet flow, and matches traffic to policy rules. Policy manager is configured to validate, save and distribute policy specifica- tions applicable to respective functions among cloud-based unified functions for packet-level and protocol-level access control and traffic inspection, threat detection and activity contextualization on inspectable and non-inspectable traffic. A unified policy is represented using a set of policy fields for (a) source of traffic to be inspected, (b) destination of the traffic, (c) protocol used by the traffic, (d) activity specified in inspectable traffic, (e) profile for a particular function and (f) action to be triggered in case of exception resulting from inspection. Values for (a) a source or (b) destination of traffic to be inspected include any traffic, a specified user, a specified group, an IP address or range, or a port number. For (c) a protocol used by the traffic, values include HTTP, TCP, UDP, or ICMP. Values for (d) an activity specified in inspectable traffic include upload, download, preview or share, and values for (e) profile for a particular function, one or more of the access control and traffic inspection, the threat detection, the activity contextualization and the data loss prevention analysis. Additionally, values for (f) for an action to be triggered in case of exception resulting from inspection include allow, block, alert, bypass, coach or quarantine. In some cases configured policies for the action of blocking can be applied to uploads and downloads, and in other cases the configured policy for block can be applied to only uploads or only downloads.

Figure 5:
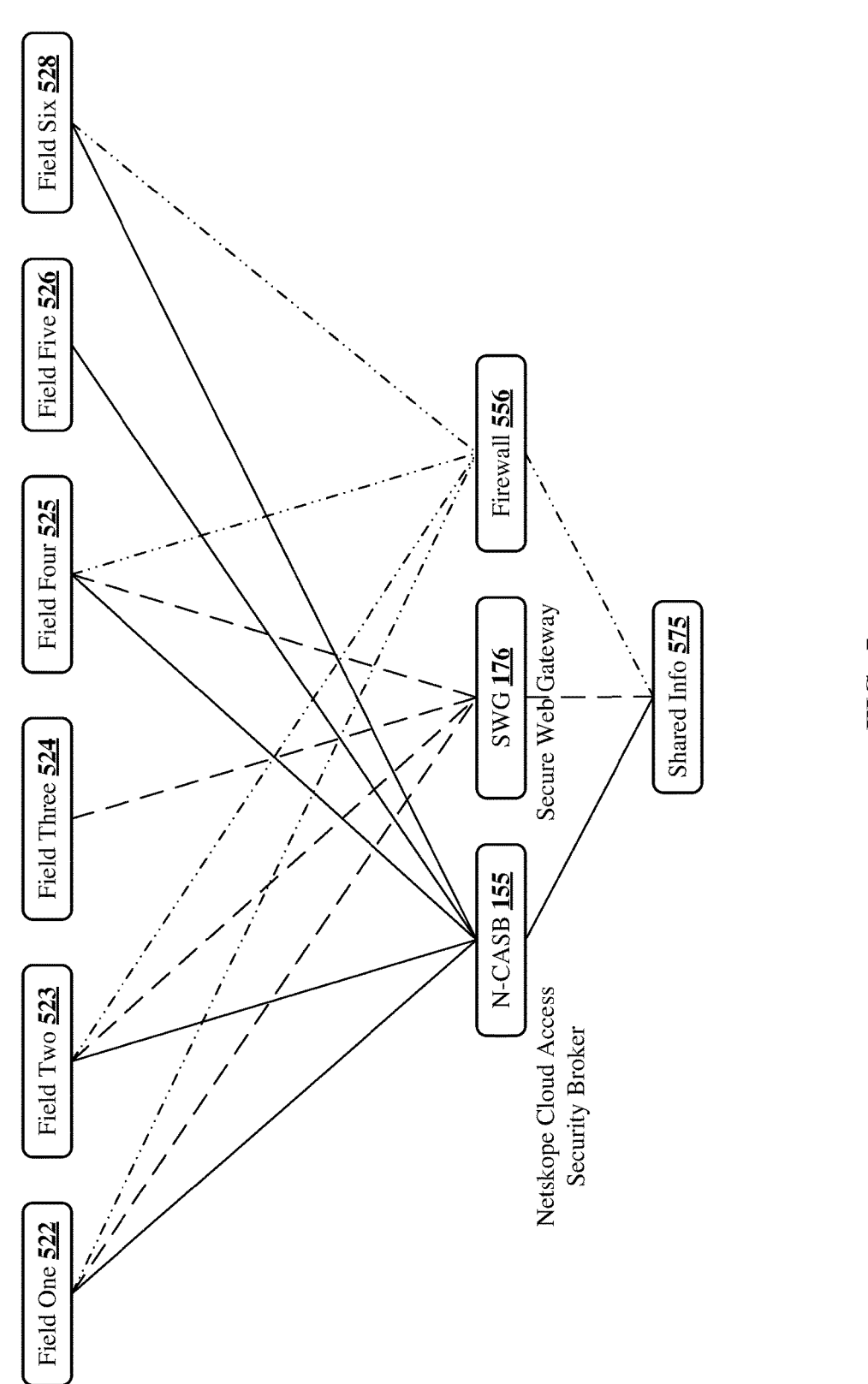
FIG. 5 shows examples of common fields for expressing a unified policy in the disclosed cloud-based policy enforcement system that unifies functions of packet-level and protocol-level access control and traffic inspection, threat detection and activity contextualization on inspectable and non-inspectable traffic.

FIG. 5 shows examples of common fields for expressing a unified policy in the disclosed cloud-based security system that unifies functions of packet-level and protocol-level access control and traffic inspection, threat detection and activity contextualization and inspection on potentially inspectable and non-inspectable traffic. Data manager 715 handles a superset of fields 522, 523, 524, 525, 526, 528 used to specify security policies, including common fields shared by two or more of the unified functions across the cloud-based unified functions of N-CASB 155, secure web gateway (SWG) 176 and firewall 556. Multiple source fields can be in use for a particular packet. Example policy fields are listed next.

Src [user, group, organizational unit, IP/port, . . . ]
Dst [App, category, IP/port, domain, . . . ]
Protocol {TCP, UDP, ICMP, . . . ]
Activity [upload, download, preview, . . . ]
Action [allow, block, alert, bypass, quarantine, coach, . . . ]

Multiple cloud-based security functions can generate an action, such as allow, block, alert, bypass, quarantine, coach, and encrypt, as listed earlier. A summary, in table form, of usage of example policy fields for expressing unified policy for multiple cloud-based security functions is described next, with criteria for actions listed across the top. N-CASB 155 can match on the source (Src), destination application (Dst App), destination (Dst) IP/port/domain, activity and profile fields for HTTP/S traffic and apply an action. Secure web gateway (SWG) 176 can match on all Src/Dst fields, and activity and profile, apart from Dst app, for HTTP/S traffic, and apply an action. Firewall 556, which can represent a combination of the unified functions for app firewall 445 and network firewall 455, can match on the Src/Dst fields, apart from Dst category, for all traffic and for non-HTTP/S profiles, and apply an action.

| | Src | Dst App | Dst Category | Dst IP/port/ domain | Protocol | Activity | Profile |
|---|---|---|---|---|---|---|---|
| N-CASB | Y | Y | N | Y | HTTP/S | Y | Y |
| SWG | Y | N | Y | Y | HTTP/S | N | Y |
| FW | Y | Y | N | Y | All | N | Y for non-HTTP/S |

In a first example, the unified policy allows users to access Office365, a set of applications that have both HTTP/S and non-HTTP/S traffic, so both N-CASB 155 and firewall 556 would try to match traffic with Office365, depending on the protocol, and apply the action. SWG 176 will also categorize traffic as safe and allow it. The rule for this policy is listed next.

Src=any, dst=O365, protocol=any, action=allow

In a second example, the unified policy in the rule is a specific DLP profile such as DLP_PII_Profile, which allows users to use storage apps but do DLP of certain content on download activity. The rule for this policy is listed next.

Src=any, category=storage, protocol any, activity=download, profile=DLP, action=block SWG 176 will inspect to determine if HTTP/S traffic is for some storage app and N-CASB 155 will do DLP because the activity field is set. The category is shared with N-CASB 155 and N-CASB 155 will do DLP on download activities to prevent personally identifiable information (PII) from being transferred.

Figure 6:
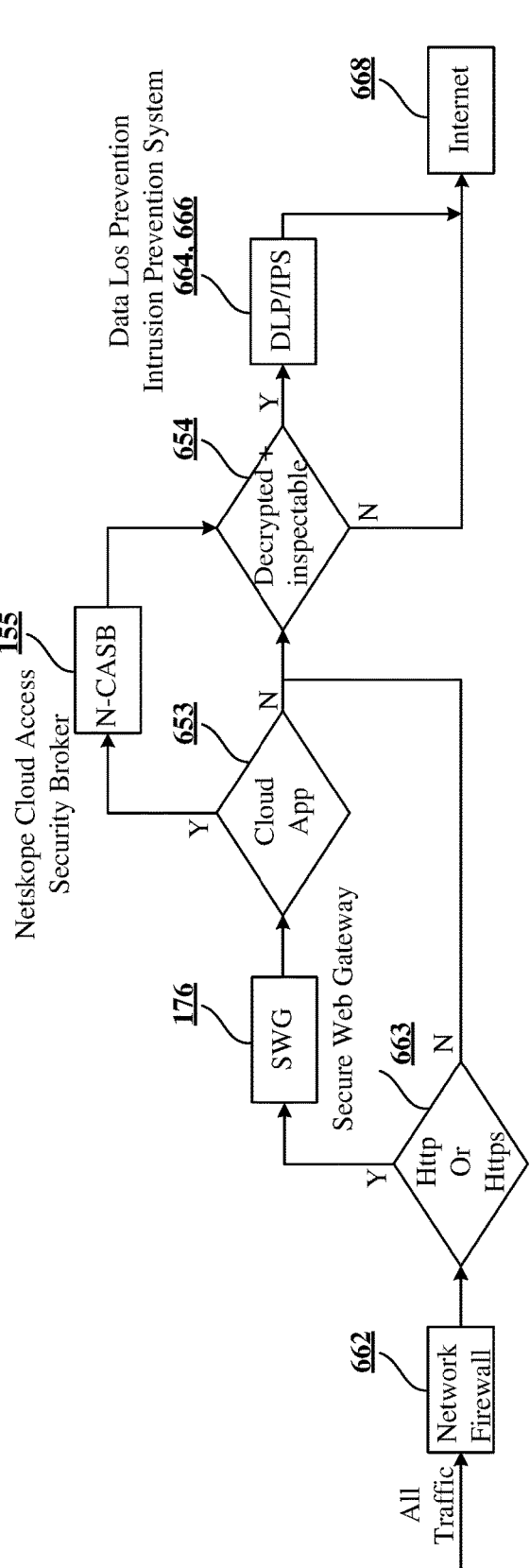
FIG. 6 shows a representative user interface usable for configuring policy specifications for a cloud-based policy enforcement system that unifies functions of packet-based and protocol-based access control and traffic inspection, threat detection and activity contextualization on inspectable and non-inspectable traffic.

FIG. 6 illustrates an example logical traffic flow for the cloud-based policy enforcement system that unifies functions of access control and traffic inspection, threat detection and activity contextualization and performs data loss prevention analysis on inspectable and non-inspectable traffic, for one embodiment of the disclosed technology. In this example of packet flow, all traffic enters via network firewall 662, at an IP address which can be defined by an IP address, or hostname. For another implementation, network firewall 662 could be defined by domain name. In yet another implementation, a combination of domain and IP addressing could be utilized for accessing network firewall 662. Firewall 662 does deep packet inspection, including checking for correct origin and well-formed packets, as malformed packets could be designed to crash the firewall, in one example. Even for HTTP/S traffic, network firewall 662 continues to inspect subsequent packets to detect malformed traffic as packets go to SWG 176 and N-CASB 155, and could recognize activity—including upload, download, preview, etc., for traffic along with inspection of the routing protocol in some implementations. Firewall 662, SWG 176 and N-CASB 155 can apply their respective policies in parallel and can allow, block, alert and apply other actions when they determine which policy to apply.

Continuing the description of logical traffic flow, firewall 662 analyzes traffic 663 and routes web traffic, utilizing Hypertext Transfer Protocol (http) and Hypertext Transfer Protocol Secure (https) to secure web gateway (SWG) 176. Non-http/https traffic gets routed separately, to be filtered to determine whether it is decrypted and inspectable 654. One example of non-web traffic utilizes TCP_54000, for port 54000, which is not an HTTP/S port. SWG 176 identifies acceptable categories of white/blacklist of destinations for web browsing, with granular policy controls for managing web traffic that can include threat protection, URL filtering, and DLP policies. Cloud apps are specified by web domain, with traffic analyzed to determine packets for a cloud app 653, such as software as a service (SaaS). Identified packets are routed to Netskope cloud access security broker (N-CASB) 155, which securely processes traffic over streaming protocols and web traffic over other protocols, in addition to governing access and activities in sanctioned and unsanctioned cloud apps, securing sensitive data and preventing its loss, and protecting against internal and external threats as described earlier. N-CASB 155 identifies users and allows traffic for them and shares the user information with firewall 662 so that firewall 662 can allow those users to access non-HTTP/S services also. After inspection at N-CASB 155, traffic gets filtered to determine whether it is decrypted and inspectable 654, and if the traffic is decrypted and inspectable, the packets are routed for data loss prevention (DLP) 664 and intrusion prevention system (IPS) 666 inspection. DLP/IPS is done asynchronously and when issues are detected, firewall 662, SWG 176 and N-CASB 155 take action based on the restrictive states and restrictive flags, and the configured enabled policies. Packets that are deemed safe are allowed to pass through to the Internet 668. Other actions, including blocking, alerting bypassing, quarantining and coaching are described earlier.

The above description with reference to FIGS. 2-6 rely on the ability of SWG 176 and N-CASB 155 to decrypt and inspect traffic during a secure session. As indicated at decision 654 in FIG. 6, packets that are not decryptable and inspectable cannot be routed for DLP 664 and IPS 666 inspection. Accordingly, the remaining options are to allow encrypted traffic to bypass said inspection processes, blocking the traffic, or quarantining the traffic, and each of these options runs the risk of a security breach or substantial limitations to productivity within an enterprise. As it becomes increasingly common for cloud-based resources to rely on pinned certificates to bolster secure connections from eavesdropping or injection from bad actors, this can paradoxically introduce security hazards by hindering the capability of network security systems to monitor the traffic. The use of certificates as a form of authentication in TLS and other communication protocols, as well as the implementation of pinned certificates in contrast to traditional TLS handshakes and reliance on certificate authorities, will now be discussed. Next, various implementations of the technology disclosed that augment the system features described in FIGS. 1-6 to enable inspection of pinned-certificate traffic are introduced.

Figure 7:
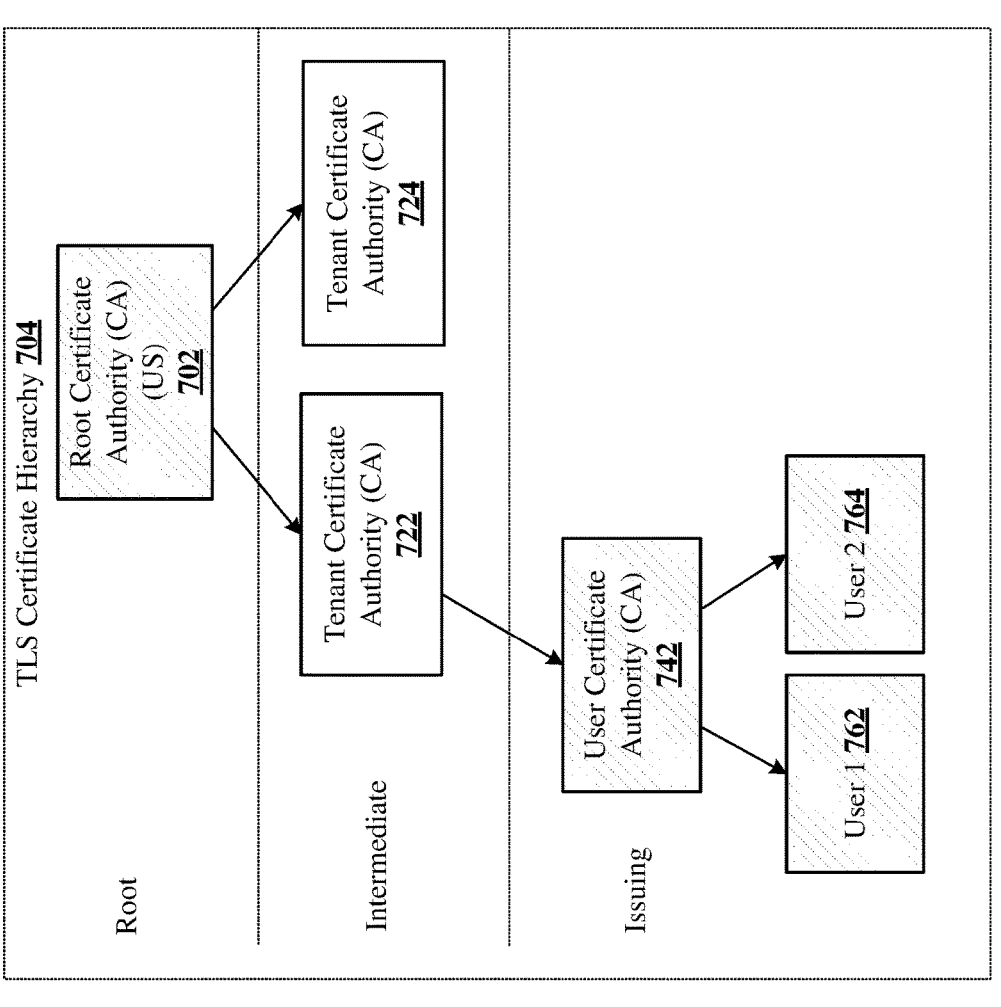
FIG. 7 illustrates an example TLS certificate hierarchy, with regional lines of separation for US and EU.

Visibility Into Traffic Over Secure Sessions With Certificate-Pinned Applications TLS Certificate Hierarchies FIG. 7 shows a block diagram 700 illustrating an example TLS certificate hierarchy 705. The creation of TLS certificate hierarchy 704 relies on a public key infrastructure (PKI) certificate authority. The public key infrastructure (PKI) is the set of roles, policies, hardware, software and procedures needed to create, manage, distribute, use, store and revoke digital certificates and manage public-key encryption. The PKI certificate authority creates the certificate authority (CA) digital certificates. The trust anchor for the digital certificate is a root CA 702. A root CA may be based on an open-source protocol, a private commercial authority, or a public government authority. For example, the root CA 702 is a US-issued public CA. Government agencies establish strict cybersecurity protocol policies regulations directed towards the issuance of certificates, such as the U.S. Federal PKI. In another example, a root CA may be associated with a European certification standard (denoted Root CA (EU) herein, in contrast to a Root CA (US) like that of CA 702). Multiple intermediate CAs branch from root CA 702, in a parent-child relationship rooted to the root CA 702. Organization CAs, or private/internal CAs, can also be used to issue certificates for internal use in some implementations. In one implementation, an organization CA can be kept in a secure hardware security module (HSM). Child CAs get certified by the corresponding parent CA back to the root CA. Intermediate organization or tenant certificate authorities 722 and 724 are intermediate CAs, subordinate to the root CA 702. They can provide certificates to users, to computers, and to other services issuing certificates to other CAs in the CA hierarchy. In the example TLS certificate hierarchy 704, intermediate certificate authority 722 issues user certificate authority 742, which in turn issues a CA to user 1 762 and a CA to user 2 764. Additional levels of hierarchy may be utilized in some implementations.

In many TLS sessions, secure communication is established in reliance on a certificate hierarchy like that of hierarchy 704. For example, a cloud-based resource can return an X.509 certificate signed by a trusted root authority. The X.509 certificate binds an identity to a public key using a digital signature. The certificate contains an identity (e.g., a hostname, an organization, or an individual) and a public key (RSA, digital signature algorithm (DSA), ed25519, etc.) and is either signed the certificate authority or is self-signed.

When a certificate is signed by a trusted CA, or validated by other means for self-signed certificates, a party holding that certificate can use the public key it contains to establish secure communications with another party, or to validate documents digitally signed by the corresponding public key. Encryption-based protocols like TLS and SSL initiate an authentication handshake between communicating devices to verify the identity of the devices in addition to digitally signing data in order to provide data integrity and verify that the data has not been tampered with before reaching its intended recipient. Public keys are public, but the private key (i.e., used in digital signatures for verification) cannot be distributed without introducing severe data security risks. Existing network security services can keep the private key stored securely to perform decryption of data. However, performing TLS handshakes can potentially risk compromising the private key of a party within the connection, and consequently, anyone can masquerade as the party (i.e., compromising security, as the CA is signed by the trusted private key).

In contrast, certificate pinning protocols do not rely on DNS for name/address mappings or certificate authorities, effectively preventing security breaches resulting from insecure key distribution via PKI. Instead, the expected certificate, or public key, that is associated with a cloud-based resource server is kept within a certificate store locally stored on a client device and/or added to the application storage on the client device associated with the application used to connect with the cloud-based resource. In order for the client endpoint to establish a secure session with the cloud-based resource, the certificate presented towards the client must match the expected certificate "pinned" to the device or application, now described in further detail with reference to FIGS. 8A and 8B.

Pinned Certificate Authentication

Figures 8A, 8B:
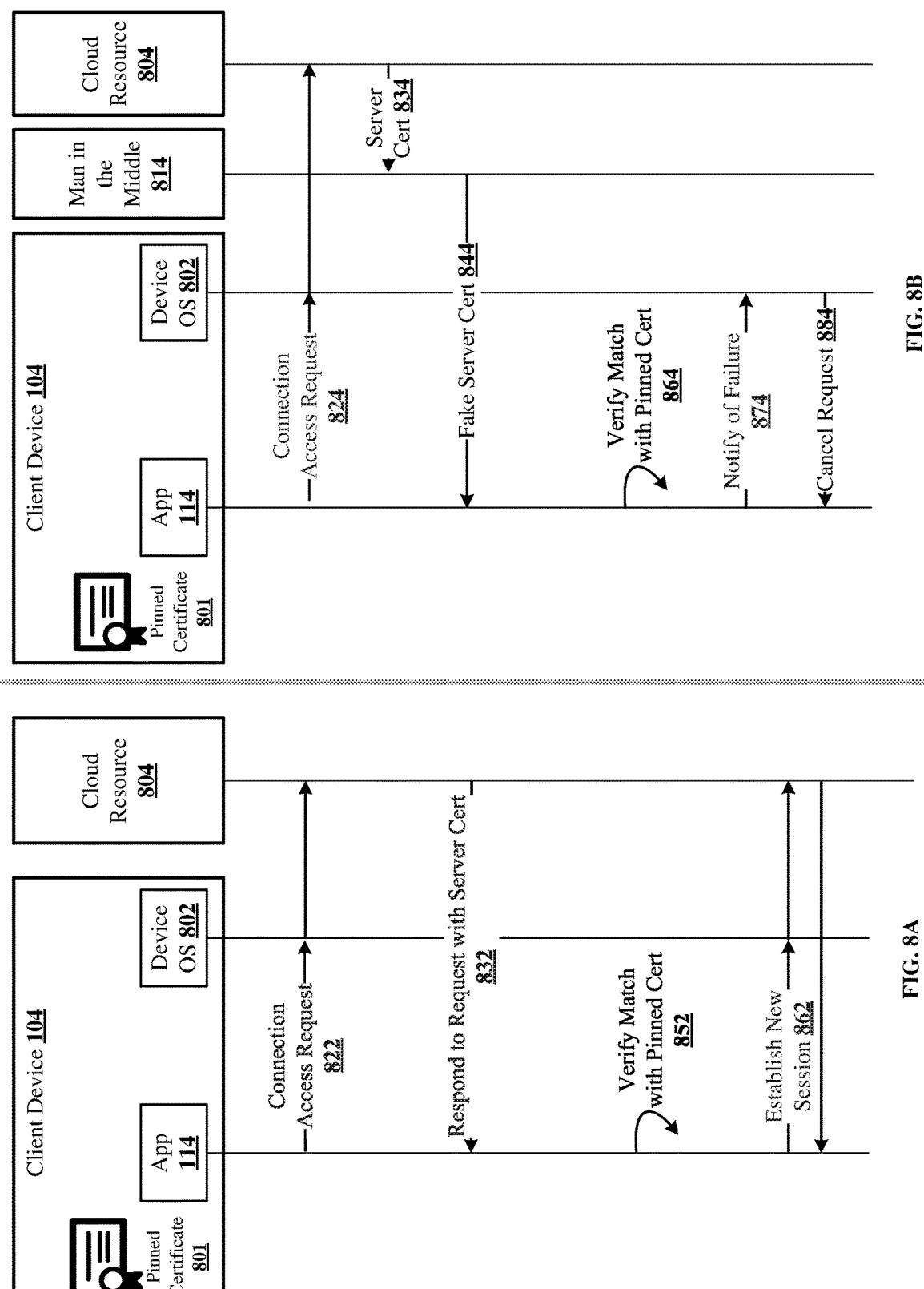
FIGS. 8A-8B illustrate respective message flow diagrams for establishing a secure session with a cloud resource that leverages certificate pinning, in accordance with one implementation of the technology disclosed.

FIGS. 8A-8B illustrate respective message flow diagrams for establishing a secure session with a cloud resource that leverages certificate pinning, in accordance with one implementation of the technology disclosed. In FIGS. 8A-8B, an application 114 (e.g., a web browser) running on client device 104 seeks to connect with a cloud-based resource 804. Access to the cloud-based resource 804 relies on certificate pinning, and a pinned certificate 801 associated with cloud-based resource 804 is stored locally on client device 104. In other implementations, the application 114 verifies a CommonName entry of the server-side certificate or checks the fingerprint of the server-side certificate. In FIG. 8A, the certificate presented by cloud-based resource 804 matches pinned certificate 801, and the secure session can thus be successfully established. In FIG. 8B, the certificate presented by cloud-based resource 804 does not match pinned certificate 801, so the connection is blocked.

In operation 822, application 114 sends a connection access request to cloud-based resource 804. In response to the connection access request, the TLS handshake is performed and application 114 is able to further examine the server-side certificate and check one or more fields within the certificate, leveraging the device OS 802, which stores the pinned certificate within a restricted location in memory. In response to the connection access request, cloud-based resource 804 presents a certificate in operation 832. During the TLS handshake, the validity of the server-side certificate is checked, but the certificate-pinned application 114 must perform further verification using the pinned certificate 801. Accordingly, communication between the application 114 and the certificate store within device 802 facilitates authentication of the server-side certificate by verifying that the server-side certificate matches with pinned certificate 801 in operation 852. As a result, a new session is established between the application 114 on client device 104 and cloud-based resource 804 in operation 862.

Similarly, in FIG. 8B, application 114 sends a connection access request to cloud-based resource 804 in operation 824. In operation 834, cloud-based resource 804 presents a certificate. However, cloud-based resource 804 has been compromised by a malicious man-in-the-middle 814 that intercepts the server-side certificate and sends a fake certificate imitating the true certificate for cloud-based resource 804 to the client in operation 844. When verification is performed in operation 864, the fake certificate will not be successfully verified because it does not match the expected certificate 801 pinned to client device 104. Consequently, after in operation 864 in which the mismatch is detected, the device OS 802 is notified of the failed match in operation 874. To prevent a security breach, the access request is canceled in operation 884 and the connection fails. In some implementations, a security administrator is notified of the blocked connection.

Figure 9:
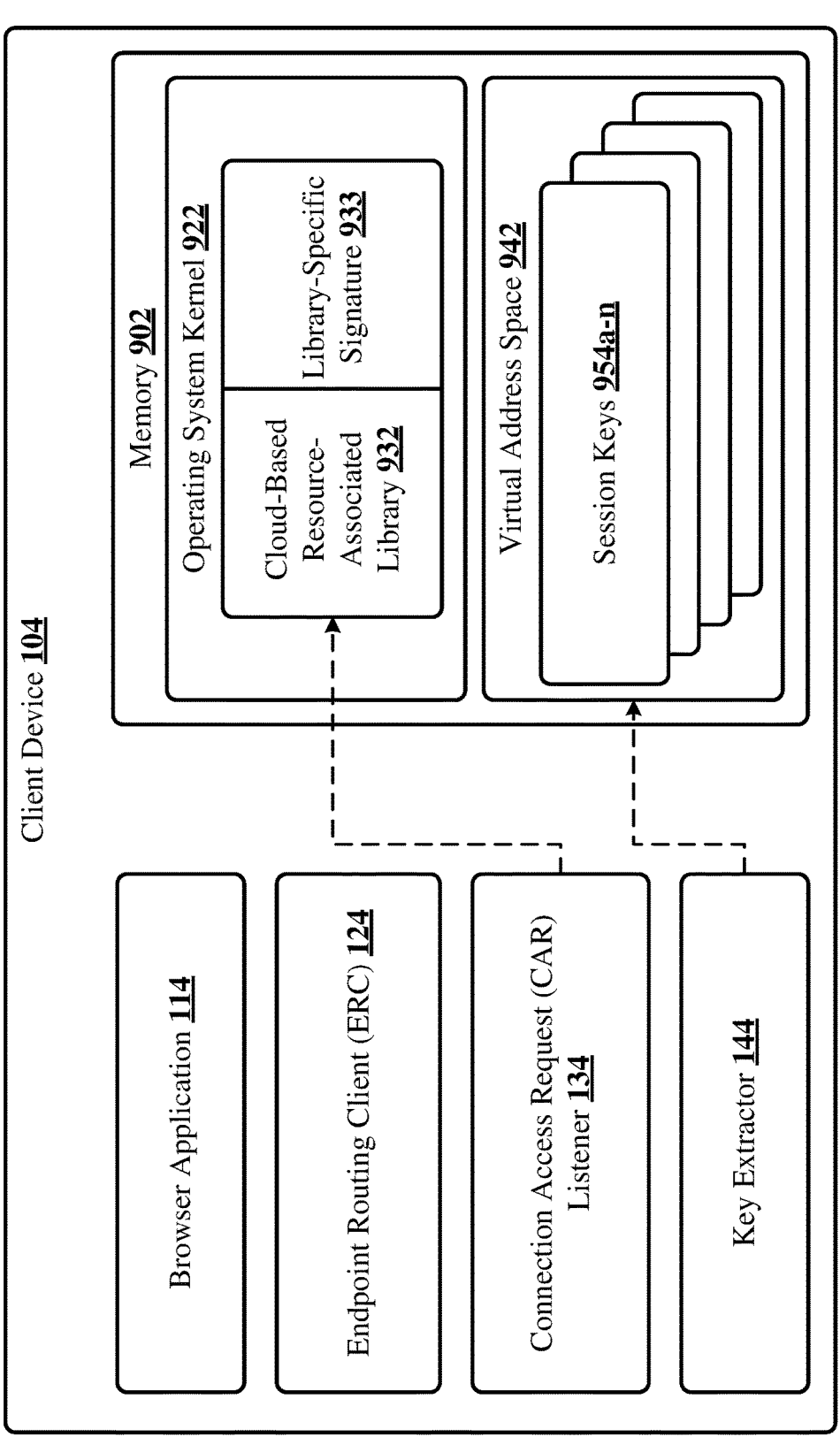
FIG. 9 is an architectural level schematic of a certificate-pinned client device including a connection access request (CAR) listener module and a key extractor module configured to detect and extract session keys associated with the pinned certificate, in accordance with one implementation of the technology disclosed.

For the same reasons that the man-in-the-middle cannot successfully achieve visibility into a connection between the client and cloud-based resource in FIG. 8B, SWG 176 is also unable to decrypt and inspect traffic within a connection between the client and cloud-based resource. However, if the SWG 176 has access to the session keys, decryption of session traffic becomes possible. FIG. 9 introduces an approach for detecting and extracting session keys associated with a pinned certificate, according to one implementation of the technology disclosed.

Session Key Extraction

FIG. 9 is an architectural level schematic 900 of a certificate-pinned client device 104 including a connection access request (CAR) listener module 134 and a key extractor module 144 configured to detect and extract session keys 954a-n associated with the pinned certificate, in accordance with one implementation of the technology disclosed. First, the components of schematic 900 are introduced, followed by a description of the interconnections between the respective components. A client device 104 houses a browser application 114, ERC 124, connection access request (CAR) listener 134, and key extractor 144. Memory 902 stored on client device 104 further houses an operating system (OS) kernel 922, in which a library 932 associated with cloud-based resource 108 and an associated library-specific signature 933 are stored, and a virtual address space 942, in which session keys 954a-n are stored.

The ERC 124 operating on client device 104 tunnels loss prevention inspectable connection access requests to the SWG 176 over a secure encrypted channel. In addition, ERC 124 routes bandwidth conservable connection access requests to a cloud-based resource 108.

A list of example ERC modules includes bypass list(s), a supplemental bypass list(s), a user identity, a policy, a parser, a classifier, and a domain whitelist(s), either embedded into the ERC 124 or as standalone items. Regarding ERC 124, depending on the type of device, it can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. ERC 124 can also be an agent that is downloaded using e-mail or silently installed using mass deployment tools like ConfigMgr™, Altris™, and Jamf™.

When a browser application 114, e.g., Google Chrome™, seeks to connect to cloud-based resource 108, the connection access request is routed via ERC 124. As described above with reference to FIGS. 8A-8B, in order to successfully establish a connection with cloud-based resource 108, the presented certificate must be authenticated and verified to match the pinned certificate stored on client device 104. One approach to comparing the presented certificate and expected certificate pinned to client device 104 is now discussed in further detail, according to certain implementations of the technology disclosed.

In TLS certificate handshakes that do not use a pinned certificate, client devices may rely on an operating system certificate store, a local storage location containing a number of trusted root certificate authorities. A cloud service obtains a certificate from a trusted CA, which vouches for the integrity of the certificate. A digital signature associated with the certificate verifies the origin of the certificate, i.e., the certificate authority that issued the certificate after authenticating the identity of the cloud service. When the cloud service presents a certificate for authentication and the root CA signature matches a trusted CA (or other trusted digital certificate signature) within the certificate store, the identity of the cloud service is successfully authenticated. If the cloud service identity associated with the certificate is compromised or has not been updated in the interval specified by the CA policies, the CA can revoke the certificate until the cloud service re-authenticates their identity. In contrast, pinned certificate protocols do not rely solely on a list of trusted certificate authorities stored within an OS certificate store in order to verify the authenticity of a certificate. Instead, an additional check is performed that relies on expected encryption data associated with the certificate for a cloud service is stored locally within a device memory and cannot be accessed without the appropriate kernel permissions. Accordingly, it is difficult to compromise the sensitive encryption data associated with the certificate.

Device OS kernel 922 within device memory 902 leverages a set of kernel instrumentation functionalities to enable verifiable and restricted sub-programs within the kernel to be executed dependent on kernel permissions. For example, such kernel instrumentation functionalities may include extraction of restricted data from memory 902 allocated to a particular application (e.g., browser 114) operating on the device 104. The extraction of restricted data often relies on connections linking one or more kernel instrumentation functionalities to the application 114 such that an operation executed by application 114 triggers a corresponding kernel execution of an associated restricted sub-program. When the restricted sub-program is executed with the proper kernel privileges, such as executing a sub-program within library 932 with library-specific signature 933, target data within the virtual address space 942 associated with application 114, such as session keys 954a-n, can be extracted.

For example, in order to access the session keys 954a-n associated with the pinned certificate for application 114 within the virtual address space 942, an operation executed by application 114 seeking to verify that a certificate matches the identity of the cloud-based resource 108 can trigger the appropriate corresponding kernel execution of the resource-associated restricted sub-program within library 932 by OS kernel 922 using signature 933, resulting in an output containing the location and/or value of the session keys 954a-n within virtual address space 942.

The technology disclosed leverages the CAL listener 134 operating on client device 104 to eavesdrop on the connection access request and execution of the subprogram in library 932 linked to the connection access request in order to obtain the location within the virtual address space 942 where the session keys 954*a-n* are stored. Next, the key extractor 144 operating on client device 104 extracts session keys 954*a-n* from memory 902 and shares the extracted keys 954*a-n* with the SWG 176 to enable decryption and inspection of packets bi-directionally transmitted during the session.

Figure 10:
FIG. 10 is a high-level block diagram of interactions between the client device and a cloud-based resource over a public network, monitored by a secure web gateway.

FIG. 10 is a high-level block diagram 1000 of interactions between the client device 104 and cloud-based resource 804 over a public network 101, monitored by SWG 176. The key extraction method illustrated within FIG. 9 can be leveraged by SWG 176 for visibility into secure session traffic between device 104 and cloud-based resource 804, which uses a pinned-certificate protocol as described with reference to FIGS. 8A-8B.

Client device 104 uses ERC 124 to securely tunnel sessions with cloud-based resource 804 via public network 101 through SWG 176. When a new session initiation is detected, CAL listener 134 determines the location of the session keys 954*a-n* within a virtual address space 942 and communicates this location to key extractor 144. Key extractor extracts the session keys 954*a-n* and sends the keys to SWG 176 to enable packet inspection. SWG 176 bi-directionally forwards the encrypted packets between client device 104 and cloud-based resource 804 in the new session, and buffers the encrypted packets until SWG 176 receives the extracted session keys 954*a-n*. Once SWG 176 has received the extracted session keys 954*a-n*, the extracted session keys 954*a-n* are applied to session traffic in the buffer and data portions of the buffered packets can subsequently be decrypted. While SWG 176 continues to forward the encrypted packets, the extracted session keys 954*a-n* continue to be applied to decrypt ongoing session traffic after processing the buffered packets.

If review of the decrypted data portions results in detection of a security condition that requires alerting an administrator 1002, as defined by the set security policies, the SWG 176 raises an alert to administrator 1002. The administrator can terminate the session in response to the alert in one implementation.

In some implementations, SWG 176 continues to successively receive a plurality of extracted session keys 954*a-n* from key extractor 144. In one implementation, this occurs after a full handshake has been completed to validate the certificate, while in another implementation, the keys can be extracted concurrently with the handshake and forwarded to the SWG 176 as the handshake is completed, reducing the amount of buffer time. Less than four kilobytes of session data need to be buffered in order to process the buffered packets in certain implementations. In another implementation, HTTP2 sessions using multiplexing between device 104 and cloud-based resource 804 are decrypted in a sequential order. Within the multiple traffic streams, each individual session includes an encrypted substream of session data. The SWG 176 successively buffers each encrypted stream of session data, and decrypts the encrypted substreams in the same order as the substreams were buffered.

Figure 11:
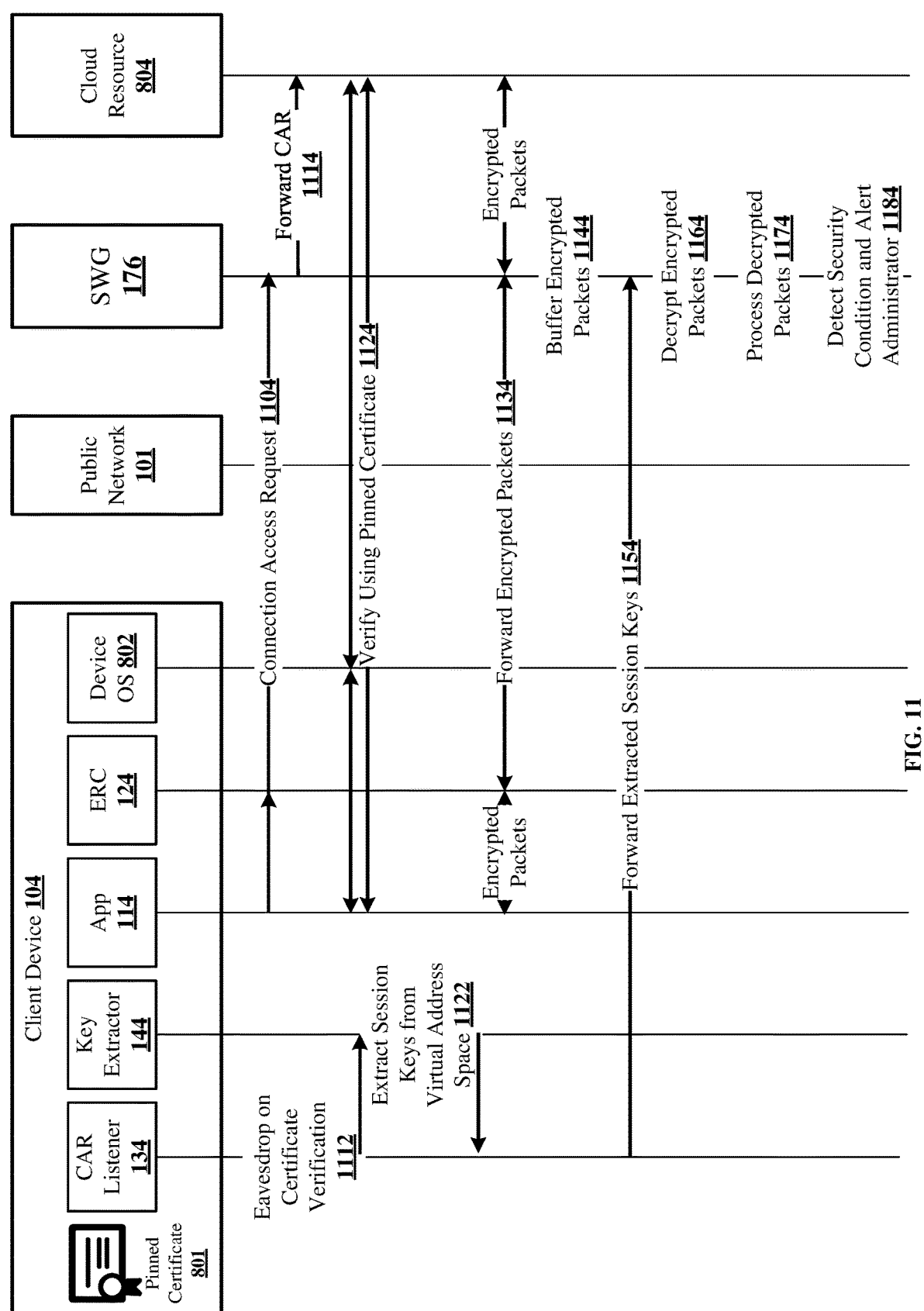
FIG. 11 is a message flow diagram for providing security monitoring of secure sessions between certificate-pinned applications on a client device and a cloud-based resource, according to certain implementations of the technology disclosed.

FIG. 11 is a message flow diagram for providing security monitoring of secure sessions between certificate-pinned applications 114 on a client device 104 and a cloud-based resource 804, according to certain implementations of the technology disclosed.

FIG. 11 includes a client device 104, public network 101, SWG 176, and cloud-based resource 804. Client device 104 further includes a pinned certificate 801, CAR listener 134, key extractor 144, browser application 114, ERC 124, and device OS 802. In operation 1104, a connection access request is sent from the browser application 114 and funneled through ERC 124, which forwards the request via the public network 101 to SWG 176 in operation 1104. In operation 1114, the connection access request reaches cloud-based resource 804. In response, the pinned certificate verification process described in FIGS. 8A, 8B, 9, and 10 is performed, summarized by operation 1124. While the pinned certificate data is being extracted for verification, the CAR listener is eavesdropping on the extraction in order to identify the location of the session keys within the virtual address space and communicate this information to key extractor 144 within operation 1112.

Key extractor 144 extracts the session keys from the cloud-based resource-associated virtual address space in operation 1122. In the implementation shown within FIG. 11, the secure session is established prior to SWG 176 receiving the session keys from key extractor 144. Accordingly, in operation 1134, SWG 176 bi-directionally forwards the encrypted packets between the client device 104 and the cloud-based resource 804, and in operation 1144, SWG 176 buffers the encrypted packets. At operation 1154, the key extractor forwards the extracted keys to the SWG 176. Although the session keys are forwarded to the SWG 176 as soon as they are available (e.g., subsequent to the handshake completion), there is an inherent race between the encrypted data stream post-handshake and the SWG 176 receiving and applying the session keys. At this point, SWG 176 is able to begin decrypting the encrypted packets in operation 1164, then process the decrypted packets in operation 1174 in the same order they were decrypted in. The session traffic is buffered until the session keys reach SWG 176, at which point the buffered packets are decrypted. At this point, the packets are continuously decrypted without buffering, other than any necessary buffering to the full TLS record in order to decrypt data. If a security condition indicating risk is detected in the processed packets, a security alert is raised to an administrator in operation 1184.

In the implementation described with reference to FIG. 11, the SWG 176 eavesdrops on the secure session between the client device 104 and the cloud-based resource 804 without operation as a proxy. Now, the description turns to implementations in which the SWG 176 is able to seamlessly operate as a proxy during the secure session, including certain implementations in which the SWG 176 terminates the secure session in response to a security risk.

Implementation of Proxy Inspection for Pinned-Certificate Applications

Data Plane and Management Plane Architecture

Figure 12:
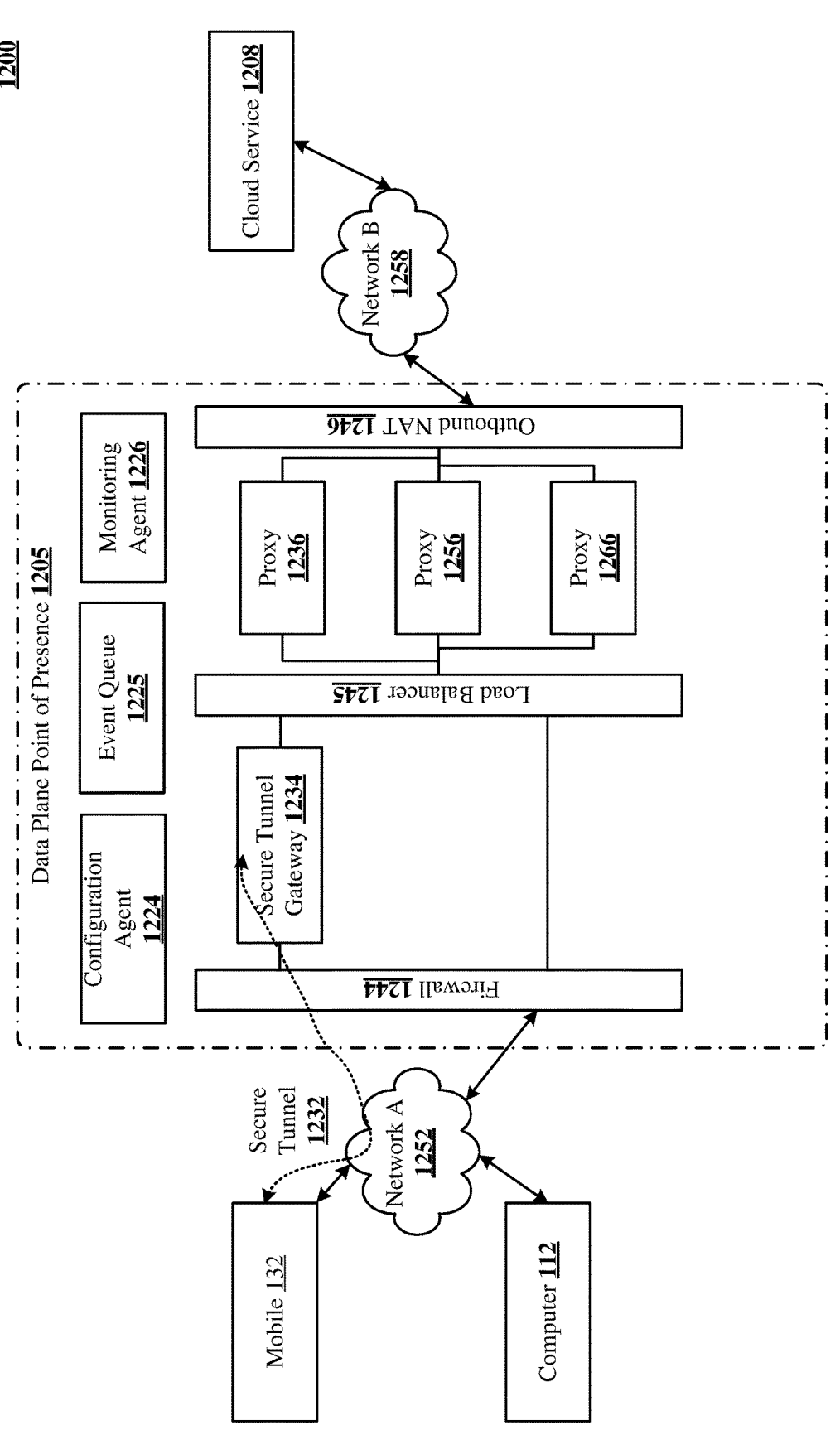
FIG. 12 shows an architectural level schematic of a data plane point of presence (PoP).

FIG. 12 shows an architectural level schematic of a data plane point of presence (POP). FIG. 12 includes a data plane point of presence 1205 (dashed-dotted box) connected to network A 1252 and network B 1258. These can be the same or different networks. Network A 1252 is also connected to client devices such as mobile 132 and computer 112. Network B 1258 is connected to the cloud service 1208. The data plane functionality is implemented according to one implementation with multiple computers, storage, and networking gear across multiple POPs such as data plane POP 1205. The elements of data plane POP 1205 include a firewall 1244, a secure tunnel gateway 1234, a load balancer 1245, multiple proxies 1236, 1256, and 1266 (each inspection proxy implements the policies according to the current configuration), and an outbound network address translation element-NAT 1246. The architecture can be further scaled, e.g., multiple firewalls, etc. The inspection proxies 1236,

1256 and 1266 implement the specific policy, e.g., drop, reset, redirect, requests (or entire flows), as well as generate the logging messages. The terms "proxy" and "inspection proxy" are used interchangeably in this document and should be considered as such.

The data plane POP 1205 also includes a configuration agent 1224 for receiving configuration and policy information from the management plane, an event queue 1225 for recording and/or storing events to be sent to the management plane, and a monitoring agent 1226 for monitoring the performance and status of the data plane POP 1205. These items are generally coupled in communication with one or more management plane POPs, e.g., management plane POP 1305 of FIG. 13 described below, as well as the other elements of the data plane (not shown in order to focus on the data flow). Similarly, the configuration systems are not shown here. The difference between configuration and policy is that configuration information is information provided by the operator of the network security system, e.g., how many data plane POPs to have active, what version of the inspection proxy software to load, etc., while policy information is provided by administrative users of the system, e.g., corporate IT personnel.

Also shown in FIG. 12 is an example of the secure tunnel 1232 used by mobile 132 and other mobile clients. In contrast, the data from computer 112 is routed directly from the firewall 1244 to the load balancer 1245. Some client types use secure tunnels (here one is being used for mobile) and others do not (here one without a secure tunnel is being used for the computer).

Figure 13:
FIG. 13 shows an architectural level schematic of a management plane point of presence (PoP).

FIG. 13 shows an architectural level schematic of a management plane point of presence (PoP). FIG. 13 includes a management plane POP 1305 to implement the management plane functionality. Some implementations may have only a single management plane POP, while others may have multiple POPs. The inter-relationship and communications with the data plane POP 1205 are shown in FIG. 13 with large double-headed arrows. The communications between management clients 1384 and the client devices 112, 122, 132 and the management plane POP 1305 are similarly represented.

Management plane POP 1305 includes: summary data 1332, raw event data 1334, configuration 1336, policies 187, web management interface 1362, provisioning service 1366, configuration service 1328, event storage service 1326, monitoring service 1324, and report generator 1322. The services bridge the management/data planes: configuration service 1328 communicates with configuration agent 1224; event storage service 1326 communicates with event queue 1225; monitoring service 1324 communicates with configuration agent 1224. The report generator 1322 is a management-plane-only item in this implementation, combing the raw event data 1334 to generate summary data 1332 for reporting. The web management interface 1362 enables administration and reporting via web browsers. The provisioning service 1366 provides client devices with the appropriate client, for configuration. The provisioning service 1366 may also be responsible for providing policy updates to client devices 112, 122, 132. In other implementations, event storage service 1326 and/or monitoring service 1324 may accept data directly from cloud services and/or other sources for unified logging and reporting.

While data plane point of presence 1205 and management plane point of presence 1305 are described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Proxy Certificates

Figure 14:
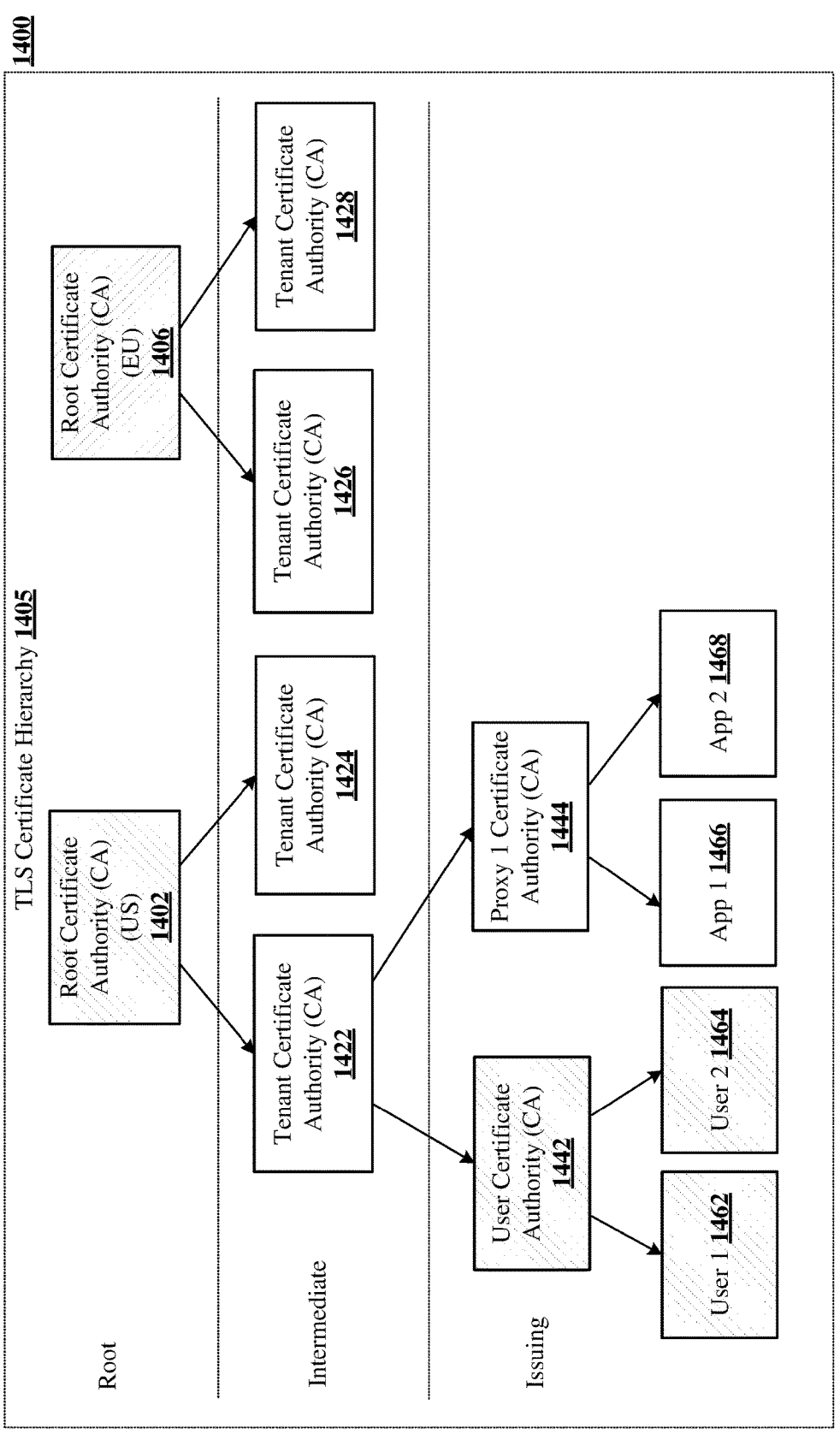
FIG. 14 illustrates an example TLS certificate hierarchy, with regional lines of separation for US and EU.

FIG. 14 illustrates an example TLS certificate hierarchy 1400 with regional lines of separation for the US 1402 and EU 1406. The public key infrastructure (PKI) is the set of roles, policies, hardware, software and procedures needed to create, manage, distribute, use, store and revoke digital certificates and manage public-key encryption. The PKI certificate authority creates the CA digital certificates. The trust anchor for the digital certificate is the organization certificate authority 1402, 1406. Multiple intermediate CAs branch from these organization CAs, in a parent-child relationship rooted to the organization CA. The organization CA can be kept in a secure HSM, as described below. Child CAs get certified by the corresponding parent CA back to the organization CA. Intermediate organization or tenant certificate authorities 1422, 1424, 1426, 1428 are intermediate CA, subordinate to the organization CA. They can provide certificates to users, to computers, and to other services issuing certificates to other CAs in the CA hierarchy. In the example TLS certificate hierarchy 1400, intermediate certificate authority 1422 issues user certificate authority 1442, which in turn issues a CA to user 1 1462 and a CA to user 1 1464. Additional levels of hierarchy may be utilized in another implementation, such as for Federal government security.

Proxy Integration for Pinned Certificate TLS Sessions

While the hierarchy of FIG. 14 can be implemented for cloud-based resources 104 that do not use pinned certificates, the architectures of FIGS. 12 and 13 are not compatible with a pinned certificate protocol used by cloud-based resource 804. The technology disclosed provides a solution to this problem, as described further with reference to FIGS. 15 and 16 below. Following receipt of a symmetrical session key that will be used during a new session, the SWG 176 can take over as a proxy and change at least one byte in the session traffic, in the direction from the client device 104 to the cloud-based resource 804 and/or from the direction of the cloud-based resource 804 to the client device 104. The SWG, acting as the inspection proxy, continues to decrypt and re-encrypt traffic in one or both directions.

Figure 15:
FIG. 15 is a high-level block diagram of interactions between client device and a cloud-based resource over a public network, mediated by an inspection proxy for security monitoring of session data transmitted between the client device and the cloud-based resource.

FIG. 15 is a high-level block diagram of interactions between client device 104 and a cloud-based resource 804 over a public network 101, mediated by an inspection proxy 1502 for security monitoring of session data transmitted between the client device 104 and the cloud-based resource 804. FIG. 15 contains the same elements of FIG. 10, including the browser application 114, ERC 124, CAR listener 134, key extractor 144, and memory 902 of client device 104. FIG. 15 illustrates the SWG 176 operating as a proxy 1502 capable of inspecting session traffic between client device 104 and cloud-based resource 804, including injection of data into the traffic.

Figure 16:
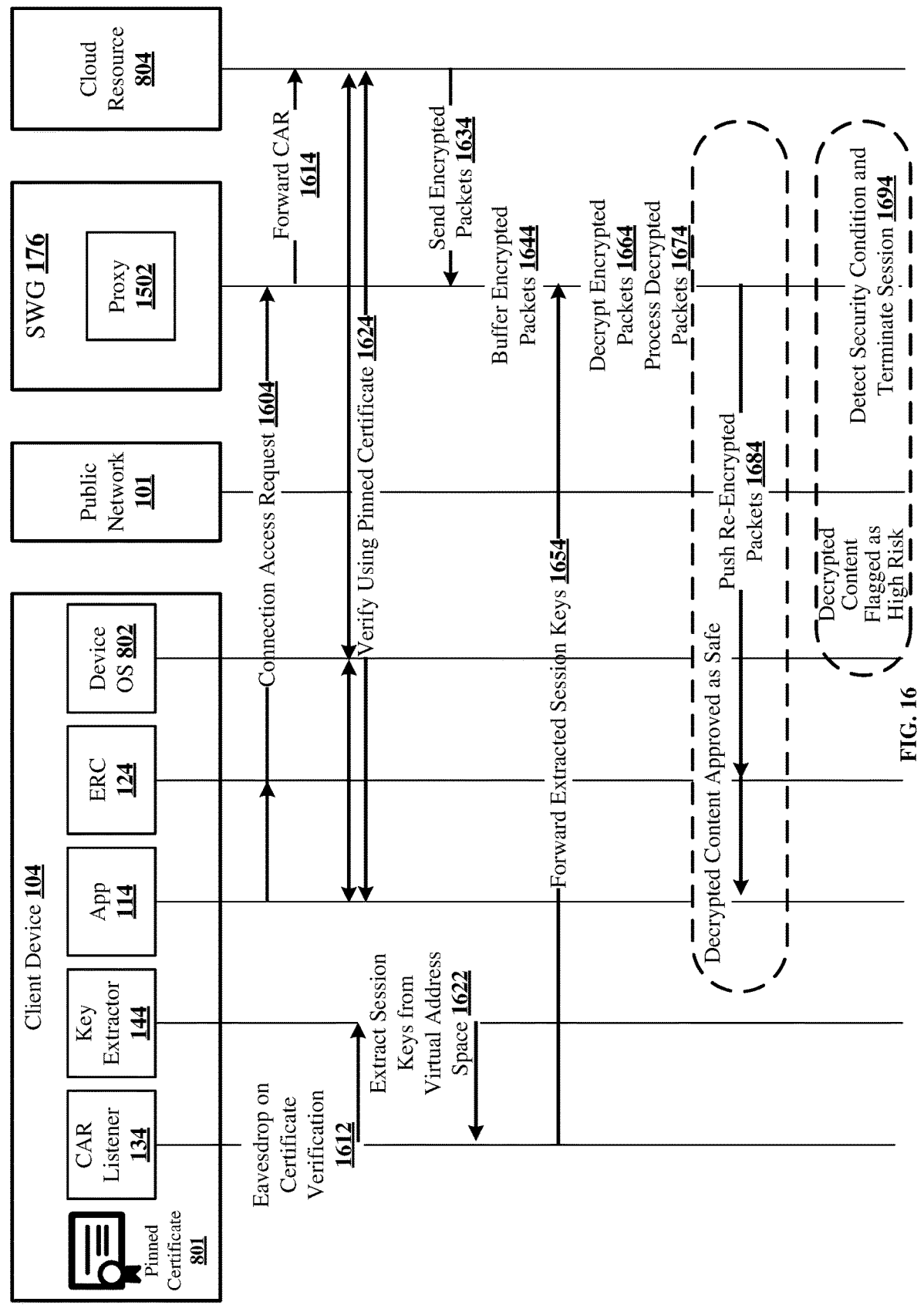
FIG. 16 is a message flow diagram for inspecting the secure sessions between certificate-pinned applications on a client device and a cloud-based resource, according to certain implementations of the technology disclosed.

FIG. 16 is a message flow diagram for inspecting the secure sessions between certificate-pinned applications on a client device 104 and a cloud-based resource 804, according to certain implementations of the technology disclosed. FIG. 16 includes a client device 104, public network 101, SWG 176 including a proxy component 1502, and cloud-based resource 804. Client device 104 further includes a pinned certificate 801, CAR listener 134, key extractor 144, browser application 114, ERC 124, and device OS 802. In operation 1604, a connection access request is sent from the browser application 114 and funneled through ERC 124, which forwards the request via the public network 101 to SWG 176. In operation 1614, the connection access request reaches cloud-based resource 804. In response, the pinned certificate verification process described in FIGS. 8A, 8B, 9, and 10 is performed, summarized by operation 1624. In operations 1612 and 1622, CAR listener 134 and key extractor 144 work to identify the location of the session keys within the virtual address space and communicate this information to SWG 176 within operation 1654.

Key extractor 144 extracts the session keys from the cloud-based resource-associated virtual address space in operation 1122. In the implementation shown within FIG. 16, the secure session is established prior to SWG 176 receiving the session keys from key extractor 144. In other implementations, SWG 176 may receive the session keys prior to the session handshake being completed. Once SWG 176 has the session keys, in operation 1634, SWG 176 receives encrypted packets from the cloud-based resource 804 (or bi-directionally forwards the encrypted packets between the client device 104 and the cloud-based resource 804) and in operation 1144, SWG 176 buffers the encrypted packets. Once the key extractor 144 forwards the extracted keys in operation 1654, SWG 176 is able to begin decrypting the encrypted packets in operation 1164, then process the decrypted packets in operation 1174 in the same order they were decrypted in. If no security risk is detected, the packets are re-encrypted and pushed through to client device 104 in operation 1684. In some implementations, SWG 176 changes at least one byte in the traffic data prior to forwarding the re-encrypted packets. If a security condition indicating risk is detected in the processed packets, SWG 176 can terminate the session in operation 1184 by injecting one or more bytes into the session.

Computer System

Figure 17:
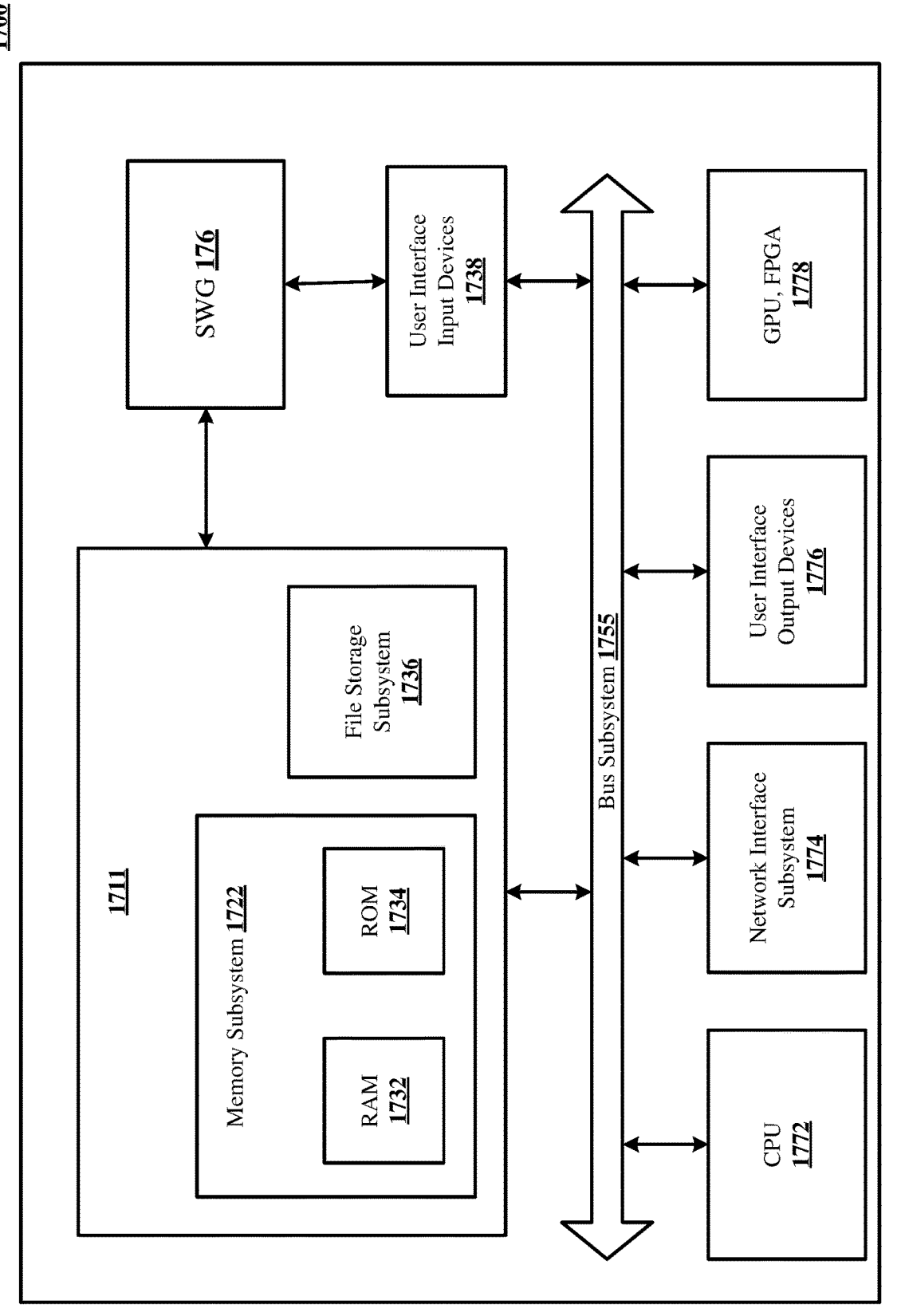
FIG. 17 is a simplified block diagram of a computer system that can be used for providing a proxy intermediate certificate authority, within accordance with an implementation of the disclosed technology.

FIG. 17 is a simplified block diagram of a computer system 1700 that can be used for providing a proxy intermediate certificate authority. System 1700 can also be used for generating certificates for use by a proxy interposed between cloud-based services and user systems. Computer system 1700 includes at least one central processing unit (CPU) 1772 that communicates with a number of peripheral devices via bus subsystem 1755 and SWG 176 for providing network security services described herein. These peripheral devices can include a storage subsystem 1717 including, for example, memory devices and a file storage subsystem 1736, user interface input devices 1738, user interface output devices 1776, and a network interface subsystem 1774. The input and output devices allow user interaction with computer system 1700. Network interface subsystem 1774 provides an interface to outside networks, including an interface to corresponding interface devices in other computer systems.

In one implementation, SWG 176 of FIG. 1 is communicably linked to the storage subsystem 1717 and the user interface input devices 1738.

User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1717 stores programming and data constructs that provide the functionality of some or all of the modules and methods described herein. Subsystem 1778 can be graphics processing units (GPUs) or field-programmable gate arrays (FPGAs).

Memory subsystem 1722 used in the storage subsystem 1717 can include a number of memories including a main random-access memory (RAM) 1732 for storage of instructions and data during program execution and a read only memory (ROM) 1734 in which fixed instructions are stored. A file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1736 in the storage subsystem 1717, or in other machines accessible by the processor.

Bus subsystem 1755 provides a mechanism for letting the various components and subsystems of computer system 1700 communicate with each other as intended. Although bus subsystem 1755 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1700 depicted in FIG. 17 is intended only as a specific example for purposes of illustrating the preferred embodiments of the present invention. Many other configurations of computer system 1700 are possible having more or less components than the computer system depicted in FIG. 17.

Particular Implementations

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One implementations of the technology disclosed is a method of security monitoring of and generating alerts during a transport layer security (TLS) or other pinned certificate session. The method includes using an endpoint routing client on a client device to securely tunnel sessions with cloud-based resources via a public network through a secure web gateway (SWG). For a new session with a cloud-based resource that uses a pinned certificate, the SWG buffers encrypted packets and bi-directionally forwards the encrypted packets between the client device and the cloud-based resource, detects initiation of the new session and sends a request to a key extractor running on the client device to perform a key extraction for one or more keys being used in the new session. After receiving the one or more extracted keys, applying the extracted keys to session traffic in the buffer, and decrypting data portions of the buffered packets while continuing to forward the encrypted packets, the SWG further applies the extracted keys to decrypt ongoing session traffic after processing the buffered packets, detects, from review of the decrypted data portions, a security condition that requires alerting an administrator, and raises an alert to the administrator. Other embodiments of this aspect include corresponding computer systems, apparatus, and computer programs recorded on one or more computer storage devices, each configured to perform the actions of the methods.

The methods described in this and following sections can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

The disclosed method can include successively receiving a plurality of extracted keys and forwarding them to the secure web gateway, where the new session begins using asymmetrical keys, and the new session includes deriving a symmetrical key. The SWG applies the symmetrical key to decrypt the session traffic. In some implementations, the new session resumes a prior session with less than a full handshake, and the method includes deriving a symmetrical key and the SWG applying the symmetrical key to decrypt the session traffic.

Certain implementations include multiple secure sessions, in which each session of the multiple sessions includes an encrypted substream of session data, and the SWG successively buffers the encrypted substream of session data corresponding to each session of the multiple sessions, then successively decrypts the encrypted substream of session data corresponding to each session of the multiple sessions in the same order as the multiple substreams of session data were buffered.

In the technology disclosed, the one or more extracted keys are extracted from a virtual address space associated with a client device TLS (or other pinned certificate) handling process. The one or more extracted keys are associated with a specific TLS or other pinned certificate protocol, enabling the SWG to apply the extracted keys to session traffic in the buffer and decrypt the buffered packets. The secure forwarding of the one or more extracted keys further includes matching the one or more extracted keys to the specific TLS or other pinned certificate protocol used in the new session. The administrator terminates the session in response to the alert received from the secure web gateway. The pinned certificate is an accepted certificate located in a local storage on the client device. The pinned certificate is detected in the local storage using a signature specific to one or more libraries used by the cloud-based resource. Less than four kilobytes of session data need to be buffered in order to process the buffered packets. The method can also include the administrator establishing at least one security policy that defines a particular security condition associated with particular content identifiable within a decrypted session data stream. Implementations of the described techniques may include hardware, a method or process, or computer software on a computer-accessible medium.

This method and the following methods and each optional feature also can be practiced as an article of manufacture or a system. The article of manufacture is a non-transitory computer readable medium holding computer instructions that, when executed on hardware, cause the hardware to perform or execute actions of any of the methods. A related implementation that is entertained in some jurisdictions is to a computer program that performs actions of any of the methods. A system includes hardware coupled to memory holding computer instructions that, when executed on hardware, cause the hardware to perform or execute actions of any of the methods. The individual methods and method steps are not repeated for these articles of manufacture and systems, for the sake of brevity. The extension of the methods into articles of manufacture and systems is illustrated in the claims that follow.

In certain implementations of the technology disclosed, the SWG acts as a proxy and changes one or more bytes in at least one traffic direction during the secure session. The method can further involve detecting, from review of the decrypted traffic, a security condition that requires injecting data into the new session, where the taking over as a proxy is delayed until after the detecting. Other implementations of the methods described in the preceding sections can include a tangible non-transitory computer-readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

We claim:

1. A computer-implemented method of security monitoring of and generating alerts during a Transport Layer Security ("TLS") or other pinned certificate session, the method including:

on a client device, using an endpoint routing client to securely tunnel sessions via a public network, through a secure web gateway hosted on a cloud, to cloud-based resources hosted by a third party provider;

for a new session with a cloud-based resource that uses a pinned certificate, detecting initiation of the new session and sending a request to a key extractor running on the client device to perform a key extraction for one or more keys being used in the new session;

the secure web gateway buffering encrypted packets and bi-directionally forwarding the encrypted packets between the client device and the cloud-based resource;

receiving the one or more extracted keys, applying the extracted keys to session traffic in the buffer, and decrypting data portions of the buffered packets;

while continuing to forward the encrypted packets, further applying the extracted keys to decrypt ongoing session traffic after processing the buffered packets;

detecting from review of the decrypted data portions a security condition that requires alerting an administrator; and the secure web gateway raising an alert to the administrator.

2. The computer-implemented method of claim 1, further including:

on the client device, successively receiving a plurality of extracted keys and forwarding them to the secure web gateway, wherein:

the new session begins using asymmetrical keys, and the new session includes deriving a symmetrical key; and the secure web gateway applying the symmetrical key to decrypt the session traffic.

3. The computer-implemented method of claim 1, further including:

on the client device, successively receiving a plurality of extracted keys and forwarding them to the secure web gateway, wherein:

the new session resumes a prior session with less than a full handshake, including deriving a symmetrical key; and the secure web gateway applying the symmetrical key to decrypt the session traffic.

4. The computer-implemented method of claim 1, further including decrypting multiple sessions in a sequential order, wherein:

each session of the multiple sessions includes an encrypted substream of session data, and the secure web gateway successively buffers the encrypted substream of session data corresponding to each session of the multiple sessions, and the secure web gateway successively decrypts the encrypted substream of session data corresponding to each session of the multiple sessions in the same order as the multiple substreams of session data were buffered.

5. The computer-implemented method of claim 1, wherein the one or more extracted keys are extracted from a virtual address space associated with a client device TLS or other pinned certificate handling process.

6. The computer-implemented method of claim 5, wherein the one or more extracted keys are associated with a specific TLS or other pinned certificate protocol, enabling at least one of the secure web gateway to apply the extracted keys to session traffic in the buffer and decrypt the buffered packets.

7. The computer-implemented method of claim 6, further including matching the one or more extracted keys to the specific TLS or other pinned certificate protocol used in the new session.

8. The computer-implemented method of claim 1, wherein the session is terminated in response to the alert received from the secure web gateway.

9. The computer-implemented method of claim 1, wherein the pinned certificate is an accepted certificate located in a local storage on the client device.

10. The computer-implemented method of claim 9, wherein the pinned certificate is detected in the local storage using a signature specific to one or more libraries used by the cloud-based resource.

11. The computer-implemented method of claim 1, wherein less than four kilobytes of session data need to be buffered in order to process the buffered packets.

12. The computer-implemented method of claim 1, further including the administrator establishing at least one security policy that defines a particular security condition associated with particular content identifiable within a decrypted session data stream.

13. A non-transitory computer readable medium including program instructions that, when executed on a processor coupled to a session, cause the processor to implement a method of security monitoring of and generating alerts during a Transport Layer Security ("TLS") or other pinned certificate session, the method including:

on a client device, using an endpoint routing client to securely tunnel sessions via a public network, through a secure web gateway hosted on a cloud, to cloud-based resources hosted by a third party provider;

for a new session with a cloud-based resource that uses a pinned certificate, detecting initiation of the new session and sending a request to a key extractor running on the client device to perform a key extraction for one or more keys being used in the new session;

the secure web gateway buffering encrypted packets and bi-directionally forwarding the encrypted packets between the client device and the cloud-based resource;

receiving the one or more extracted keys, applying the extracted keys to session traffic in the buffer, and decrypting data portions of the buffered packets;

while continuing to forward the encrypted packets, further applying the extracted keys to decrypt ongoing session traffic after processing the buffered packets;

detecting from review of the decrypted data portions a security condition that requires alerting an administrator; and the secure web gateway raising an alert to the administrator.

14. The non-transitory computer readable medium of claim 13, further including program instructions to implement:

on the client device, successively receiving a plurality of extracted keys and forwarding them to the secure web gateway, wherein:

the new session begins using asymmetrical keys, and the new session includes deriving a symmetrical key; and the secure web gateway applying the symmetrical key to decrypt the session traffic.

15. The non-transitory computer readable medium of claim 13, further including program instructions to implement:

on the client device, successively receiving a plurality of extracted keys and forwarding them to the secure web gateway, wherein:

the new session resumes a prior session with less than a full handshake, including deriving a symmetrical key; and the secure web gateway applying the symmetrical key to decrypt the session traffic.

16. The non-transitory computer readable medium of claim 13, further including program instructions to implement decrypting multiple sessions in a sequential order, wherein:

each session of the multiple sessions includes an encrypted substream of session data, and the secure web gateway successively buffers the encrypted substream of session data corresponding to each session of the multiple sessions, and the secure web gateway successively decrypts the encrypted substream of session data corresponding to each session of the multiple sessions in the same order as the multiple substreams of session data were buffered.

17. The non-transitory computer readable medium of claim 13, wherein the one or more extracted keys are extracted from a virtual address space associated with a client device TLS or other pinned certificate handling process.

18. The non-transitory computer readable medium of claim 17, wherein the one or more extracted keys are associated with a specific TLS or other pinned certificate protocol, enabling at least one of the secure web gateway to apply the extracted keys to session traffic in the buffer and decrypt the buffered packets.

19. A system including a processor and memory coupled to a session, the memory loaded with program instructions that, when executed on the processor, cause the processor to implement a method of security monitoring of and generating alerts during a Transport Layer Security ("TLS") or other pinned certificate session, the method including:

on a client device, using an endpoint routing client to securely tunnel sessions via a public network, through a secure web gateway hosted on a cloud, to cloud-based resources hosted by a third party provider;

for a new session with a cloud-based resource that uses a pinned certificate, detecting initiation of the new session and sending a request to a key extractor running on the client device to perform a key extraction for one or more keys being used in the new session;

the secure web gateway buffering encrypted packets and bi-directionally forwarding the encrypted packets between the client device and the cloud-based resource;

receiving the one or more extracted keys, applying the extracted keys to session traffic in the buffer, and decrypting data portions of the buffered packets;

while continuing to forward the encrypted packets, further applying the extracted keys to decrypt ongoing session traffic after processing the buffered packets;

detecting from review of the decrypted data portions a security condition that requires alerting an administrator; and the secure web gateway raising an alert to the administrator.

20. The system of claim 19, further including program instructions to implement:

on the client device, successively receiving a plurality of extracted keys and forwarding them to the secure web gateway, wherein:

the new session begins using asymmetrical keys, and the new session includes deriving a symmetrical key; and the secure web gateway applying the symmetrical key to decrypt the session traffic.

21. The system of claim 19, further including program instructions to implement:

on the client device, successively receiving a plurality of extracted keys and forwarding them to the secure web gateway, wherein:

the new session resumes a prior session with less than a full handshake, including deriving a symmetrical key; and the secure web gateway applying the symmetrical key to decrypt the session traffic.

22. The system of claim 19, further including program instructions to implement decrypting multiple sessions in a sequential order, wherein:

each session of the multiple sessions includes an encrypted substream of session data, and the secure web gateway successively buffers the encrypted substream of session data corresponding to each session of the multiple sessions, and the secure web gateway successively decrypts the encrypted substream of session data corresponding to each session of the multiple sessions in the same order as the multiple substreams of session data were buffered.

23. The system of claim 19, wherein the one or more extracted keys are extracted from a virtual address space associated with a client device TLS or other pinned certificate handling process.

24. The system of claim 23, wherein the one or more extracted keys are associated with a specific TLS or other pinned certificate protocol, enabling at least one of the secure web gateway to apply the extracted keys to session traffic in the buffer and decrypt the buffered packets.

* * * * *